United States Patent
Breck

(10) Patent No.: US 9,757,926 B2
(45) Date of Patent: Sep. 12, 2017

(54) MULTI-LAYER ETHYLENE POLYMER-BASED FILMS WITH POLYPROPYLENE-BASED STIFFENING LAYER

(71) Applicant: Liqui-Box Corporation, Richmond, VA (US)

(72) Inventor: Alan Keith Breck, Kingston (CA)

(73) Assignee: Liqui-Box Corporation, Richmond, VA (US)

( * ) Notice: Subject to any disclaimer, the term of this patent is extended or adjusted under 35 U.S.C. 154(b) by 0 days.

(21) Appl. No.: 15/364,485

(22) Filed: Nov. 30, 2016

(65) Prior Publication Data

US 2017/0136745 A1  May 18, 2017

Related U.S. Application Data

(62) Division of application No. 13/086,557, filed on Apr. 14, 2011, now Pat. No. 9,533,477.

(Continued)

(51) Int. Cl.
*B32B 27/32* (2006.01)
*B32B 27/08* (2006.01)
(Continued)

(52) U.S. Cl.
CPC .............. *B32B 27/08* (2013.01); *B29C 65/02* (2013.01); *B29C 66/51* (2013.01); *B32B 27/32* (2013.01);
(Continued)

(58) Field of Classification Search
CPC ..... B32B 27/32; B32B 27/08; B32B 2250/24; B32B 2250/242; B32B 2270/00;
(Continued)

(56) References Cited

U.S. PATENT DOCUMENTS 3,645,992 A    2/1972  Elston
4,076,698 A *  2/1978  Anderson .............. C08F 210/16
                                                        526/348.2
(Continued)

FOREIGN PATENT DOCUMENTS

CA    2113455    2/1993
CA    2165340    1/1995
(Continued)

OTHER PUBLICATIONS

"Eastman Chemical Will Be Spun Off to Become an Independent Company", Plastics Focus, Jun. 21, 1993, vol. 25, No. 12, 6 pages.
(Continued)

*Primary Examiner* — Kevin R Kruer
(74) *Attorney, Agent, or Firm* — Baker & Hostetler LLP

(57) ABSTRACT

This invention discloses a multi-layer film for making pouches for containing flowable materials, said multi-layer film comprising generally five layers in order: inner sealant-layer, first interposed layer, the core layer, second interposed layer, and the outer sealant layer. The sealant and core layers are ethylene-based, whereas the interposed layers are polypropylene-based. The multi-layer film thickness is in the range of from about 35 microns to about 66 microns. The combined thickness of the first and the second interposed layers is in the range of from about 10% to about 27% of the total thickness of said multi-layer film. Similarly, a combined thickness of the inner and the outer sealant-layers is in the range of from about 10% to about 27% of the total thickness of the multi-layer film. The interposed layers comprise polypropylene that has a melt-index of less than 0.75 dg/min.

5 Claims, 8 Drawing Sheets

Related U.S. Application Data

(60) Provisional application No. 61/324,849, filed on Apr. 16, 2010.

(51) Int. Cl.
*B65B 9/20* (2012.01)
*B65B 51/10* (2006.01)
*B29C 65/02* (2006.01)
*B29C 65/00* (2006.01)
*B29K 105/00* (2006.01)
*B29L 31/00* (2006.01)

(52) U.S. Cl.
CPC ............... *B65B 9/20* (2013.01); *B65B 51/10* (2013.01); *B29K 2105/256* (2013.01); *B29L 2031/7128* (2013.01); *B32B 2250/05* (2013.01); *B32B 2307/31* (2013.01); *B32B 2323/10* (2013.01); *B32B 2439/46* (2013.01)

(58) Field of Classification Search
CPC ............ B32B 2307/31; B32B 2439/46; B32B 2323/10; B32B 2250/05; B65B 9/20; B65B 51/10; B29K 2105/256; B29L 2031/7128; B29C 65/02; B29C 66/51
USPC .......................................................... 428/516
See application file for complete search history.

(56) References Cited

U.S. PATENT DOCUMENTS

| | | | | |
|---|---|---|---|---|
| 4,503,102 A * | 3/1985 | Mollison | ................ | B32B 27/08 206/524.9 |
| 4,521,437 A * | 6/1985 | Storms | .................... | C08J 5/18 156/198 |
| 4,804,620 A * | 2/1989 | Tang | ................... | G03C 7/3275 430/548 |
| 4,937,299 A * | 6/1990 | Ewen | ..................... | C08F 10/00 502/113 |
| 5,206,075 A * | 4/1993 | Hodgson, Jr. | .......... | B32B 27/32 428/216 |
| 5,288,531 A * | 2/1994 | Falla | ...................... | B32B 27/32 426/127 |
| 5,292,392 A * | 3/1994 | Miller | ................ | B29C 65/7433 156/308.4 |
| 5,360,648 A * | 11/1994 | Falla | ...................... | B32B 27/32 383/109 |
| 5,364,486 A * | 11/1994 | Falla | ...................... | B32B 27/32 156/145 |
| 5,453,318 A * | 9/1995 | Giacobbe | ............... | C08L 23/10 428/461 |
| 5,462,777 A * | 10/1995 | Hayashida | ............. | B32B 27/32 428/2 |
| 5,508,051 A * | 4/1996 | Falla | ...................... | B32B 27/32 383/109 |
| 5,538,590 A | 7/1996 | Riley | | |
| 5,721,025 A * | 2/1998 | Falla | ...................... | B32B 27/32 156/145 |
| 5,759,675 A * | 6/1998 | Hamada | ............. | B29C 47/0026 264/173.11 |
| 5,879,768 A * | 3/1999 | Falla | ...................... | B32B 27/32 428/35.7 |
| 5,942,579 A * | 8/1999 | Falla | ...................... | B32B 27/32 428/35.2 |
| 5,972,443 A * | 10/1999 | Breck | ..................... | B32B 27/32 156/203 |
| 5,972,486 A * | 10/1999 | Cometto | ................. | B32B 27/32 428/213 |
| 6,010,772 A * | 1/2000 | Perdomi | ................. | B32B 27/32 156/244.11 |
| 6,015,854 A * | 1/2000 | McCullough, Jr. | ... | C08F 297/08 524/396 |
| 6,086,967 A * | 7/2000 | Whiteman | .............. | B32B 27/32 206/524.1 |
| 6,117,465 A * | 9/2000 | Falla | ...................... | B32B 27/32 156/145 |
| 6,159,587 A * | 12/2000 | Perdomi | ................. | B32B 27/32 428/213 |
| 6,172,172 B1 * | 1/2001 | Burgin | ................ | C08L 23/0815 525/240 |
| 6,221,470 B1 * | 4/2001 | Ciocca | .................... | B32B 27/08 428/218 |
| 6,237,308 B1 * | 5/2001 | Quintin | ................... | B29C 65/38 53/451 |
| 6,256,966 B1 * | 7/2001 | Braun | ........................ | C08J 5/18 428/35.2 |
| 6,406,765 B1 * | 6/2002 | Braun | ........................ | C08J 5/18 428/219 |
| 6,416,833 B1 * | 7/2002 | Climenhage | ............... | C08J 5/18 428/200 |
| 6,525,138 B2 * | 2/2003 | Johoji | ................ | C08L 23/0815 525/191 |
| 6,631,605 B1 * | 10/2003 | Quintin | ............... | B29C 66/4322 206/484 |
| 6,638,636 B2 * | 10/2003 | Tucker | .................. | B29C 55/005 264/173.14 |
| 6,767,599 B2 * | 7/2004 | Braun | ........................ | C08J 5/18 428/35.2 |
| 6,795,053 B1 * | 9/2004 | Funamoto | ............ | G09G 3/3611 345/102 |
| 6,872,462 B2 * | 3/2005 | Roberts | .................... | B32B 27/32 428/213 |
| 7,294,674 B2 * | 11/2007 | Pelliconi | ................. | C08L 23/16 525/191 |
| 8,440,280 B2 * | 5/2013 | Ronzani | ................. | B32B 27/32 428/35.7 |
| 8,978,346 B2 * | 3/2015 | Breck | ..................... | B32B 27/08 428/213 |
| 2001/0028929 A1 * | 10/2001 | Breck | ..................... | B32B 27/32 428/35.5 |
| 2001/0052304 A1 * | 12/2001 | Compton | ................ | B32B 27/08 102/323 |
| 2002/0006482 A1 * | 1/2002 | Falla | .................... | A22C 13/0013 428/35.2 |
| 2004/0051189 A1 * | 3/2004 | Meier | ................. | B65D 75/5877 264/2.5 |
| 2004/0071905 A1 * | 4/2004 | Demain | ................. | B32B 27/32 428/35.7 |
| 2004/0146730 A1 * | 7/2004 | Holzer | .................. | B29C 55/023 428/515 |
| 2004/0157077 A1 * | 8/2004 | Roussos | ................ | B32B 27/08 428/518 |
| 2005/0106344 A1 * | 5/2005 | Morris | ..................... | B32B 15/08 428/35.3 |
| 2005/0124753 A1 * | 6/2005 | Ashihara | ................ | C08J 3/005 524/543 |
| 2005/0131160 A1 * | 6/2005 | Shimizu | ................ | C08F 297/08 525/242 |
| 2005/0147812 A1 * | 7/2005 | Malfait | ................... | B32B 27/32 428/349 |
| 2006/0216488 A1 * | 9/2006 | Schell | ..................... | B32B 27/08 428/213 |
| 2006/0228502 A1 * | 10/2006 | Bekele | ...................... | B32B 7/12 428/35.7 |
| 2006/0246280 A1 * | 11/2006 | Chambliss | ............... | B32B 27/08 428/354 |
| 2007/0088129 A1 * | 4/2007 | Jacobsen | .................. | D01F 6/46 525/240 |
| 2007/0252276 A1 * | 11/2007 | Lloyd-George | ...... | B29C 65/222 257/750 |
| 2007/0254119 A1 * | 11/2007 | Lloyd-George | ........ | B29C 66/71 428/35.2 |
| 2007/0269623 A1 * | 11/2007 | Breck | ..................... | B32B 27/32 428/35.5 |
| 2008/0050545 A1 | 2/2008 | Harvey | | |
| 2008/0090062 A1 * | 4/2008 | Breck | ..................... | B32B 27/32 428/220 |

(56) References Cited

U.S. PATENT DOCUMENTS

| | | | |
|---|---|---|---|
| 2011/0033135 A1* | 2/2011 | Breck | B32B 27/32 383/66 |
| 2011/0033644 A1* | 2/2011 | Breck | B32B 27/32 428/35.5 |
| 2011/0252746 A1* | 10/2011 | Breck | B32B 27/32 53/451 |
| 2011/0258969 A1 | 10/2011 | Breck | |

FOREIGN PATENT DOCUMENTS

| | | |
|---|---|---|
| CA | 2151589 | 4/1995 |
| CA | 2182524 | 8/1995 |
| CA | 2190004 | 11/1995 |
| CA | 2205172 | 3/1997 |
| CA | 2231449 | 4/1997 |
| CA | 2239579 | 6/1997 |
| CA | 2280910 | 8/1998 |
| CA | 2411183 | 5/2004 |
| CA | 2512041 | 8/2004 |
| CA | 2526873 | 12/2004 |
| EP | 0351744 | 1/1990 |
| EP | 1059326 | 12/2000 |
| EP | 1391295 | 2/2004 |
| WO | WO 95/26268 | 10/1995 |
| WO | WO 97/20693 | 6/1997 |
| WO | WO 98/34776 A1 | 8/1998 |
| WO | WO 01/53079 | 7/2001 |
| WO | WO 2011/130467 A2 | 10/2011 |

OTHER PUBLICATIONS

European Patent Application No. 07719643: Supplementary European Search Report dated Jun. 10, 2009, 2 pages.
International Patent Application No. PCT/CA2007/000717: International Search Report dated Jul. 24, 2007, 6 pages.
International Patent Application No. PCT/CA2007/001563: International Search Report dated Dec. 13, 2007, 3 pages.
International Patent Application No. PCT/US2011/032412: International Search Report dated Dec. 7, 2011, 3 pages.
International Patent Application No. PCT/US2011/032452: International Search Report dated Dec. 7, 2011, 2 pages.
Lewis, "Form-Fill-Seal", Packaging Encyclopedia, 1987, 185-188.
Randall, "Sequence Distributions versus Catalyst Site Behavior", J. Polymer Science: Part A: Polymer Chemistry, 1998, vol. 36, 1527-1542.
U.S. Appl. No. 13/086,557: Non-Final Rejection dated Dec. 18, 2014, 11 pages.
Wild et al., "The Role of Commonomer Type and Distribution in LLDPE Product Performance", Journal of Polymer Science, Poly. Phys. Ed., 1982, vol. 20, 441.

* cited by examiner

MULTI-LAYER ETHYLENE POLYMER-BASED FILMS WITH POLYPROPYLENE-BASED STIFFENING LAYER

CROSS REFERENCE TO RELATED APPLICATIONS

This application is a divisional of U.S. application Ser. No. 13/086,557 filed Apr. 14, 2011 which is related to U.S. Provisional Application No. 61/324,849 filed Apr. 16, 2010, which are incorporated by reference herein in their entirety.

FIELD OF INVENTION

This invention relates to ethylene polymer based multi-layer films with improved stiffness and clarity. This invention also relates to a process for making such multi-layer films, and to pouches for containing flowable materials made from such multi-layer films. More specifically, the present invention relates to films that have polypropylene localized closer to the outside surfaces of the multi-layer film so that the multi-layer film not only maintains its mechanical integrity but also is thinner in gauge than currently available films. In one aspect, the present invention relates to packaging flowable materials such as milk in pouches using for example, a vertical form, fill, and seal apparatus ("VFFS") technical field

BACKGROUND

In the VFFS process, a flat web of synthetic thermoplastic film is unwound from a roll and formed into a continuous tube in a tube-forming section. In the next step, the longitudinal edges of the film are sealed together to form a "lap seal" or a "fin seal." The tube then is pulled vertically downwards to a filling station and collapsed across its transverse cross-section. The position of such cross-section is at a sealing device below the filling station, which makes an air-tight transverse heat seal at the collapsed portion of the tube.

Next, the flowable material to be packaged enters the tube above the transverse heat seal, continuously or intermittently, filling the tube upwardly from the transverse heat seal. The tube is then allowed to drop a predetermined distance usually under the influence of the weight of the material in the tube. Depending on the material being packaged and the packaging process, the jaws of the sealing device are closed again. The tube collapses as a result at a second transverse section that is at, above, or below the air/material interface in the tube. The sealing device seals and severs the tube transversely at the second transverse section.

The material-filled portion of the tube is now in the form of a pillow shaped pouch. Thus, the sealing device has sealed the top of the filled pouch, sealed the bottom of the next-to-be-formed pouch and separated the filled pouch from the next-to-be-formed pouch, all in one operation.

One VFFS apparatus of the type described above is a Prepac® IS-7E liquid packaging apparatus. A commonly used sealing device, the so-called impulse sealer, has electrically insulated sealing element mounted in the sealing jaws. In operation, the sealing jaws close and simultaneously an electrical current flows through the sealing element, for example, a wire. The jaws remain closed while the seal forms, but not while it cools and solidifies. Therefore, once the sealing jaws open, the synthetic thermoplastic film must provide a molten trans-verse seal that supports the weight of the flowable material, for example, liquid, in the next-to-be-formed pouch.

For reasons of economy, customers are demanding thinner and thinner films for the pouching of fluids. This can lead to one of two problems in commercially available film formulations: (1) inadequate sealability and toughness, or (2) insufficient stiffness.

Pouches made from commercially available films tend to suffer from defective seals, that is, a tendency to have weak transverse end and/or longitudinal seals even though the operating conditions of the impulse sealer have been optimized. Defective seals may lead to the phenomenon known as "leakers," in which the flowable material, for example, milk, may escape from the pouch through pinholes that develop at or close to the seal. It has been estimated that leakers account for about 1-2% of the 1.3 liter milk pouch production.

As the pouch film is down-gauged for reasons of economy, its stiffness may also become an issue. Lack of stiffness may adversely affect the runnability of the film on a form, fill and seal apparatus and give poor stand-up properties for pouches in, for instance, a milk pitcher. However, higher stiffness has traditionally required a thicker gauge of the pouch film. But thicker gauge requires more material. The present invention, by localizing the stiffening material towards the outside of the multi-layer film, addresses both these issues in that the stiffness of the multi-layer film is not adversely affected even when its gauge thickness is reduced.

SUMMARY

The present invention relates to a multi-layer film for making pouches for containing flowable materials, said multi-layer film comprising the following layers in order, from an at least one inner sealant-layer to an at least one outer sealant-layer:

(A) said at least one inner sealant-layer comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(B) a first at least one interposed layer adjacent to said at least one inner sealant-layer, said first at least one interposed layer comprising:

(i) an at least one polypropylene interpolymer ("PI") and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (B)(i)(b);

wherein the centerline of said first at least one interposed layer is closer to the centerline of said at least one inner sealant-layer than to the centerline of said multi-layer film;

(C) at least one core layer, adjacent to said first at least one interposed layer, said at least one core layer comprising polyethylene that is selected from the group consisting of:

(i) at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(D) a second at least one interposed layer adjacent to said at least one core layer, said second at least one interposed layer comprising:

(i) an at least one polypropylene interpolymer and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (D)(i)(b);

wherein the centerline of said second at least one interposed layer is closer to the centerline of said at least one outer sealant-layer than to the centerline of said multi-layer film; and (E) said at least one outer sealant-layer, comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

wherein said multi-layer film thickness is in the range of from about 35 microns to about 66 microns;

wherein a combined thickness of said first at least one interposed layer and said second at least one interposed layer is in the range of from about 10% to about 27% of the total thickness of said multi-layer film;

wherein a combined thickness of said inner sealant-layer and said outer sealant-layer is in the range of from about 10% to about 27% of the total thickness of said multi-layer film.

This invention also relates to a process for making pouches filled with a flowable material, using a vertical form, fill and seal apparatus, wherein each pouch is made from a flat web of film by the following steps:

(I) forming a tubular film therefrom with a longitudinal seal and subsequently flattening said tubular film at a first position;

(II) transversely heat-sealing said tubular film at the flattened position;

(III) filling said tubular film with a predetermined quantity of flowable material above said first position;

(IV) flattening said tubular film above the predetermined quantity of flowable material at a second position; and (V) transversely heat sealing said tubular film at said second position, wherein said pouches are made from a flat web of film made from a multi-layer film, comprising the following layers in order of an at least one inner sealant-layer to an at least one outer sealant-layer:

(A) said at least one inner sealant-layer comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(B) a first at least one interposed layer adjacent to said at least one inner sealant-layer, said first at least one interposed layer comprising:

(i) an at least one polypropylene interpolymer and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (B)(i)(b);

wherein the centerline of said first at least one interposed layer is closer to the centerline of said at least one inner sealant-layer than to the centerline of said multi-layer film;

(C) at least one core layer, adjacent to said first at least one interposed layer, said at least one core layer comprising polyethylene that is selected from the group consisting of:

(i) at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(D) a second at least one interposed layer adjacent to said at least one core layer, said second at least one interposed layer comprising:

(i) an at least one polypropylene interpolymer and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (D)(i)(b);

wherein the centerline of said second at least one interposed layer is closer to the centerline of said at least one outer sealant-layer than to the centerline of said multi-layer film; and (E) said at least one outer sealant-layer, comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

wherein said multi-layer film thickness is in the range of from about 35 microns to about 66 microns;

wherein a combined thickness of said first at least one interposed layer and said second at least one interposed layer is in the range of from about 10% to about 27% of the total thickness of said multi-layer film;

wherein a combined thickness of said inner sealant-layer and said outer sealant-layer is in the range of from about 10% to about 27% of the total thickness of said multi-layer film; and

BRIEF DESCRIPTION OF THE DRAWINGS

FIG. 1 B shows a multilayer film of the present invention having layers of different thicknesses in comparison to FIG. 1 A.

DETAILED DESCRIPTION OF ILLUSTRATIVE EMBODIMENTS

Definitions

Figure 1A:
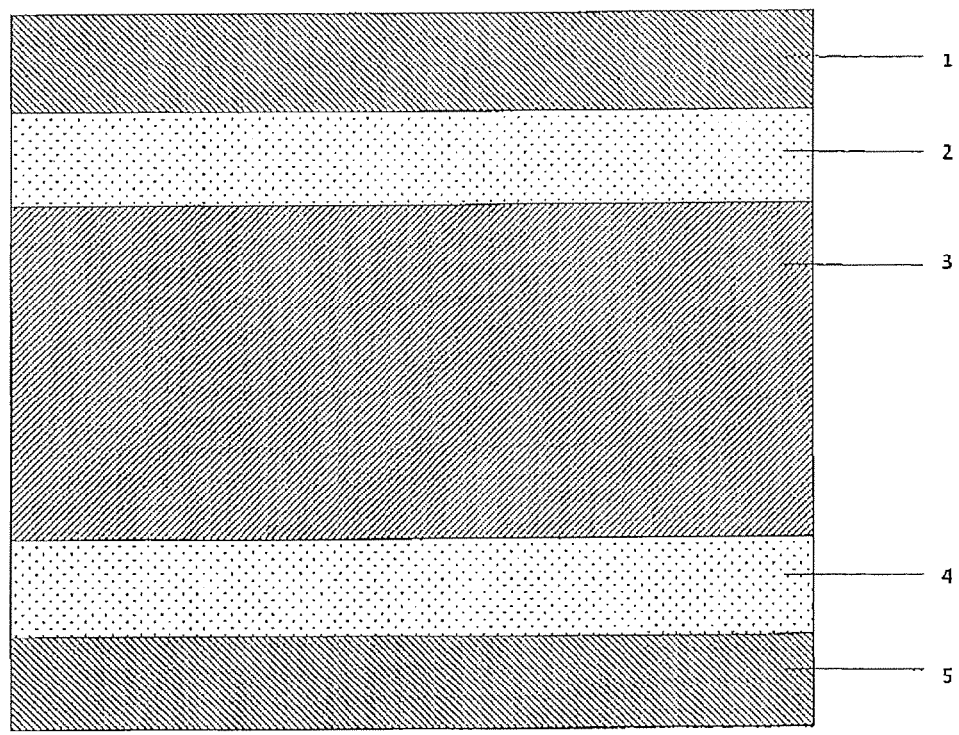
FIG. 1 A shows a general schematic of the multilayer film of the present invention.

All percentages expressed in the present patent application are by weight of the total weight of the composition unless expressed otherwise.

All ratios expressed in this patent application are on a weight:weight basis unless expressed otherwise.

In this patent application, ranges are used as shorthand only to avoid listing and describing each and every value within the range. Any appropriate value within the range can be selected as the upper value, the lower value, or the end-point of the range.

In this patent application, the singular form of a word includes its plural, and vice versa, unless the context clearly dictates otherwise. Thus, references "a," "an," and "the" generally include the plurals of the respective terms they qualify. For example, reference to "a method" includes its plural—"methods." Similarly, the terms "comprise," "comprises," and "comprising," whether used as a transitional phrase in the claims or otherwise, should be interpreted inclusively rather than exclusively. Likewise the terms "include," "including," and "or" should be construed to be inclusive, unless such a construction is clearly prohibited from the context. Similarly, the term "examples," particularly when followed by a listing of terms, is merely exemplary and illustrative and should not be deemed to be exclusive or comprehensive.

The methods, compositions, and other advances disclosed in this patent application are not limited to particular methodology, protocols, and reagents described in the application because, as the skilled artisan will appreciate, they may vary. Further, the terminology used in this application describes particular embodiments only, and should not be construed as limiting the scope of what is disclosed or claimed.

Unless defined otherwise, all technical and scientific terms, terms of art, and acronyms used in the present application have the meanings commonly understood by one of ordinary skill in the art in the field(s) of the invention, or in the field(s) where the term is used. Although any compositions, methods, articles of manufacture, or other means or materials similar or equivalent to those described in the present patent application can be used in the practice of the present invention, specific compositions, methods, articles of manufacture, or other means or materials are described only for exemplification.

All patents, patent applications, publications, technical and/or scholarly articles, and other references cited or referred to in this patent application are incorporated in their entirety by reference to the extent allowed by law. The discussion of those references is intended merely to summarize the assertions made in these references. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

GENERAL INVENTION

As used herein, the term "flowable material" does not include gaseous materials, but encompasses materials which are flowable under gravity or may be pumped. Such materials include liquids, for example, milk, water, fruit juice, oil; emulsions, for example, ice cream mix, soft margarine; pastes, for example, meat pastes, peanut butter; preserves, for example, jams, pie fillings, marmalade; jellies; doughs; ground meat, for example, sausage meat; powders, for example, gelatin powders, detergents; granular solids, for example, nuts, sugar; and like materials. The invention described herein is particularly useful for flowable foods such as milk. In addition, as used herein "density" is determined by ASTM Procedure D 1505-85, "stiffness" is understood to be tensile modulus of elasticity as measured by ASTM Procedure D 882-91 (Method A) and "melt-index" by ASTM Procedure D 1238-90B (Condition E for polyethylene and Condition L for most polypropylenes). The "melting point" of a polymer is measured as the peak melting point when performing differential scanning calorimetry (DSC) as described in ASTM Procedure D 3417-83 (rev. 88).

In one embodiment, this invention relates to polyethylene-based multi-layer films usable for pouch-making for containing of flowable materials. More specifically, this invention provides a multi-layer film that is lower in gauge (thickness) but retains an adequate combination of stiffness and toughness for its use in pouches for flowable materials.

Figure 1B:
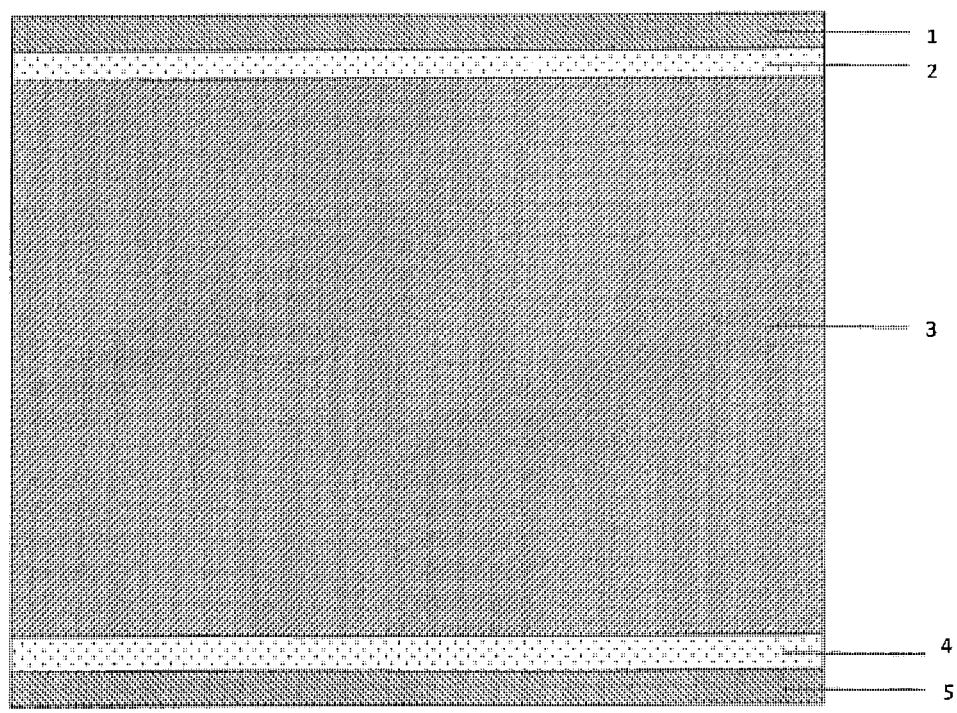

In one embodiment, the polyethylene-based multi-layer film comprises five layers (FIG. 1): an inner sealant-layer (1), a first interposed layer (2), a core layer (3), a second interposed layer (4), and the outer sealant-layer (5). The interposed layer comprises a stiff polymer-polypropylene ("PP"). Moreover, a combined thickness of the first and the second interposed layer is in the range of from about 10% to about 27% of the total thickness of the multi-layer film. Similarly, a combined thickness of the inner and outer sealant-layers is also in the range of from about 10% to about 27% of the total thickness of the multi-layer film. Stated another way, the core layer thickness ranges from about 46% (See FIG. 1A) to about 80% (see FIG. 1B) of the total thickness of the multi-layer film. Because generally, the PP is localized in the interposed layer and not distributed across the multi-layer film of the present invention, and because of the range limitations on the sealant layers and the interposed layers, the PP resides much closer to the centerline of the inner and the outer sealant-layers than to the centerline of the multi-layer film. As a result, the multi-layer film of the present invention provides a lowering of the gauge at a performance substantially similar to those films that are higher in their gauge. A PP film cannot be used on its own for fluid packaging because, for example, it lacks the required sealing and toughness properties. Moreover, if the PP is distributed throughout the pouch-making film, it renders the film hazy and unclear, and requires the use of a compatibilizer throughout the film as well to bond to the polyethylene phase. However, clear film is desired for example for making milk pouches. The present invention thus addresses all these issues.

This invention also relates to a process for making such multi-layer films and to pouches made from such multi-layer films.

More specifically, in one embodiment, the present invention relates to a polyethylene based multi-layer film that is from about 35 microns to about 66 microns thick, for making pouches for containing flowable materials. The multi-layer film comprises the following layers: an at least one inner sealant-layer, a first at least one interposed layer, an at least one core layer, a second at least one interposed layer, and an at least one outer sealant-layer, in order, from an at least one inner sealant-layer to an at least one outer sealant-layer; wherein:

(A) said at least one inner sealant-layer and/or said at least one outer sealant-layer comprises polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

wherein a combined thickness of said inner sealant-layer and said outer sealant-layer is in the range of from about 10% to about 27% of the total thickness of said multi-layer film;

(B) the first and/or the second at least one interposed layer is adjacent to said at least one inner sealant-layer or outer sealant-layer, respectively, and said first and/or the second at least one interposed layer comprises:

(i) at least one polypropylene interpolymer and at least one polymeric compatibilizer, and at least one of:

(a) an at least one high-density polyethylene, or \

(b) at least one ethylene-alpha-olefin copolymer; and (ii) optionally, a second ethylene-alpha-olefin copolymer that is not the same as said at least one ethylene-alpha-olefin copolymer in (B)(i)(b);

wherein the centerline of said first and/or the second at least one interposed layer is closer to the centerline of said at least one inner sealant-layer or at least one outer sealant layer, respectively, than to the centerline of said multi-layer film;

wherein a combined thickness of said first at least one interposed layer and said second at least one interposed layer is in the range of from about 10% to about 27% of the total thickness of said multi-layer film; and (C) said at least one core layer, adjacent to said first at least one interposed layer, comprises polyethylene that is selected from the group consisting of:

(i) at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process.

In a preferred embodiment, the multi-layer film thickness is in the range of from about 38 microns to about 63 microns. In a further preferred embodiment, the multi-layer film thickness is in the range of from about 44 microns to about 60 microns. In another preferred embodiment, the multi-layer film thickness is in the range of from about 47 microns to about 59 microns. In yet another embodiment, the multi-layer film thickness is selected from the group consisting of about 33 microns, about 34 microns, about 35 microns, about 36 microns, about 37 microns, about 38 microns, about 39 microns, about 40 microns, about 41 microns, about 42 microns, about 43 microns, about 44 microns, about 45 microns, about 46 microns, about 47 microns, about 48 microns, about 49 microns, about 50 microns, about 51 microns, about 52 microns, about 53 microns, about 54 microns, about 55 microns, about 56 microns, about 57 microns, about 58 microns, about 59 microns, about 60 microns, about 61 microns, about 62 microns, about 63 microns, about 64 microns, and about 66 microns. In a further preferred embodiment, said combined film thickness can be a number (integer or non-integer) between any two integer numbers between and including 33 microns and 66 microns identified supra. For example, the combined thickness can be about 33.1 microns, about 33.2 microns, about 33.3 microns, about 33.4 microns, about 33.5 microns, about 33.6 microns, about 33.7 microns, about 33.8 microns, about 33.9 microns, and so on and so forth.

In a preferred embodiment, the combined thickness of said first at least one interposed layer and said second at least one interposed layer is in the range of from about 10% to about 27% of the total thickness of said multi-layer film. In a preferred embodiment, the multi-layer film thickness is selected from the group consisting of about 10%, about 11%, about 12%, about 13%, about 14%, about 15%, about 16%, about 17% s, about 18%, about 19%, about 20%, about 21% s, about 22%, about 23%, about 24%, about 25%, about 26%, and about 27%. In a preferred embodiment, said combined film thickness can be a number (integer or non-integer) between any two integer numbers between and including 10% and 27% identified supra. For example, the combined thickness can be about 10.1%, about 10.2%, about 10.3%, about 10.4%, about 10.5%, about 10.6%, about 10.7%, about 10.8%, about 10.9%, and so on and so forth.

Similarly, in a preferred embodiment, the combined thickness of said inner and said outer sealant layers is in the range of from about 10% to about 27% of the total thickness of said multi-layer film. In a preferred embodiment, the multi-layer film thickness is selected from the group consisting of about 10%, about 11%, about 12%, about 13%, about 14%, about 15%, about 16%, about 17% s, about 18%, about 19%, about 20%, about 21% s, about 22%, about 23%, about 24%, about 25%, about 26%, and about 27%. In a preferred embodiment, said combined film thickness can be a number (integer or non-integer) between any two integer numbers between and including 10% and 27% identified supra. For example, the combined thickness can be about 10.1%, about 10.2%, about 10.3%, about 10.4%, about 10.5%, about 10.6%, about 10.7%, about 10.8%, about 10.9%, and so on and so forth.

The Inner and the Outer Sealant-Layer

In one embodiment, the multi-layer film comprises an at least one inner sealant layer, and an at least one outer sealant layer. The inner sealant layer is externally on one side of the multi-layer film, and the outer sealant layer is externally on the other side of the multi-layer film.

The multi-layer film comprises one inner sealant layer or more than one inner sealant-layers. For example, the multi-layer film can have two, three, or four inner sealant-layers stacked adjacent to each other. Similarly, the multi-layer film comprises one outer sealant layer or more than one outer sealant layers. For example, the multi-layer film can have two, three, or four outer sealant layers.

While it may be preferred that the inner sealant-layer and the outer sealant layer thicknesses are approximately the same, in other preferred embodiments, their thicknesses may not be the same.

Also, while it is preferred that the multi-layer film of the present invention comprises the same number of inner sealant-layers and the outer sealant layers, in other embodiments, the number of inner sealant layers may be different from the number of outer sealant layers.

For this invention, the total combined thickness of said at least one inner sealant layer and said at least one outer sealant layer is from about 10% to about 27% of the total thickness of the multi-layer film. In other embodiments of the invention, the total combined thickness of the sealant layers can be about 11%, about 12%, about 13%, about 14%, about 15%, about 16%, about 17%, about 18%, about 19%, about 20%, about 21%, about 22%, about 23%, about 24%, about 25%, about 26% and about 27%, of the total thickness of the multi-layer film. The total combined thickness of the sealant layers can also be intermediate percentage between the percentages cited supra—for example, a total combined thickness that is from about 11.1%, 11.2%, 11.3%, 11.4%, and so on and so forth between other percentages cited.

The at least one inner sealant-layer and the at least one outer sealant-layer comprise polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process.

The ethylene homopolymer used in the at least one inner sealant layer or in the at least one outer sealant layer, in one embodiment, is made in a high-pressure polymerization process. One or more ethylene homopolymers can be used in the at least one inner sealant layer or in the at least one outer sealant layer. In one embodiment, the weight percent of the ethylene homopolymer is from 0 to about 15 parts by weight of said at least one inner sealant layer or said at least one outer sealant layer. In other embodiments, the weight percent range of the ethylene homopolymer can be defined by any two numbers from about 0.0, about 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight of said at least one inner sealant layer or said at least one outer sealant layer. The ethylene homopolymer has a density in the range of from about 0.918 to about 0.923 g/cm.sup.3, and a melt-index in the range of from about 0.1 to about 1.1 dg/min. In other embodiments, the ethylene homopolymer density range can be defined by any two numbers, namely, about 0.918, about 0.919, about 0.920, about 0.921, about 0.922, and about 0.923 g/cm.sup.3, Similarly, the melt-index range can also be defined by any two numbers, namely, about 0.1, about 0.2, about 0.3, about 0.4, about 0.5, about 0.6, about 0.7, about 0.8, about 0.9, about 1.0, and 1.1 dg/min.

In another embodiment, more than one ethylene homopolymers may be used in one or more layers of the inner sealant layer or the outer sealant layers. The number of ethylene homopolymers and the type of ethylene homopolymers may vary between any two inner sealant layers or the outer sealant layers. For example, a multi-layer film comprises three inner sealant-layers (I1, I2, and I3) and three outer sealant layers (O1, O2, and O3). In one embodiment, I1, I2, and I3, and O1, O2, and O3, for example, may have only one and the same ethylene homopolymer. In another embodiment, I1, I2, and I3 may have the same ethylene homopolymer, but different from O1, O2, and O3. In another embodiment, for example, I1 may have two ethylene homopolymers while I2 may have three ethylene homopolymers, while I3 may have no ethylene homopolymer. Two ethylene homopolymers may differ from each other by having different densities, different melt-indices, different molecular weights, or different branch structures.

The ethylene copolymer used in the at least one inner sealant layer or in the at least one outer sealant layer, in one embodiment, is made in a high-pressure polymerization process. One or more ethylene copolymers can be used in the at least one inner sealant layer or in the at least one outer sealant layer. In one embodiment, the weight percent of the ethylene homopolymer is from 0 to about 15 parts by weight of said at least one inner sealant layer or said at least one outer sealant layer. In other embodiments, the weight percent range of the ethylene homopolymer can be defined by any two numbers from about 0.0, about 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5, and about 15.0 parts by weight. The ethylene copolymer has a density in the range of from about 0.930 to about 0.960 g/cm.sup.3, and a melt-index in the range of from about 0.1 to about 10 dg/min. The density range can also be defined by any two numbers from about 0.930, about 0.931, . . . , about 0.958, about 0.959, and about 0.960 g/cm.sup.3.

In another embodiment, more than one ethylene copolymers may be used in one or more layers of the inner sealant layer or the outer sealant layers. The number of ethylene copolymers and the type of ethylene copolymers may vary between any two inner sealant layers or the outer sealant layers. For example, a multi-layer film comprises three inner sealant-layers (I1, I2, and I3) and three outer sealant layers (O1, O2, and O3). In one embodiment, I1, I2, and I3, and O1, O2, and O3, for example, may have only one and the same ethylene copolymer. In another embodiment, I1, I2, and I3 may have the same ethylene copolymer, but different from O1, O2, and O3. In another embodiment, for example, I1 may have two ethylene copolymers while I2 may have three ethylene copolymers, while I3 may have no ethylene copolymer. Two ethylene copolymers may differ from each other by having different densities, different melt-indices, different molecular weights, or different branch structures.

The comonomer of ethylene in the ethylene copolymer described in the foregoing can be chosen from polar monomers such as vinyl acetate, acrylic acid, methacrylic acid, and vinyl methacrylate, wherein the ethylene copolymer is manufactured in a high-pressure polymerization process. The concentration of polar comonomer must be kept relatively low in order that the copolymer has good compatibility with the major polyethylene component of the sealant layer(s). For example, ethylene vinyl acetate copolymers should contain less than or equal to 15 wt % vinyl acetate. Otherwise, poor optical appearance, and even poor intra-layer adhesion, can result.

In another embodiment, the at least one inner sealant layer or the at least one outer sealant layer comprises at least one low-density ethylene-alpha-olefin copolymer, which may be found alone or in a blend form with an ethylene homopolymer described supra, or ethylene copolymer described supra. Such low-density ethylene alpha-olefin copolymer, in a preferred embodiment, is found as a copolymer that is from about 80 to about 98 parts by weight of the at least one inner or the at least one outer sealant layer weight. The copolymer range can also be defined by any two numbers from about 80, about 81, about 82, . . . , about 96, about 97, and about 98 parts by weight of the at least one inner or the at least one outer sealant layer weight. The copolymer is a low-density copolymer of ethylene and an at least one $C_4$-$C_{10}$ alpha-olefin manufactured in a polymerization process using a single-site polymerization catalyst, with a density in the range of from about 0.909 to about 0.935 g/cm$^3$ and a melt-index in the range of from about 0.5 to about 1.5 dg/min. The density range can also be defined by any two numbers from about 0.909, about 0.910, about 0.911, . . . , about 0.933, about 0.934, and about 0.935 g/cm$^3$. Similarly, the melt-index range can be defined by any two numbers from about 0.5, about 0.6, about 0.7, about 0.8, about 0.9, about 1.0, and about 1.1 dg/min. In addition, said embodiment further comprises, from about 0 to about 15 parts by weight of an additional at least one low-density copolymer of ethylene and an at least one $C_4$-$C_{10}$ alpha-olefin. In other embodiments, the weight percent range of the ethylene homopolymer can be defined by any two numbers from about 0.0, about 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5 and about 15.0 parts by weight. Said additional at least one low-density copolymer is an ultra-low density copolymer of ethylene and said at least one $C_4$-$C_{10}$ alpha-olefin, manufactured in a polymerization process using a single-site polymerization catalyst, with a density in the range of from about 0.859 to about 0.888 g/cm$^3$ and a melt-index in the range of from about 0.4 to about 0.6 dg/min. The density range can also be defined by any two numbers from about 0.859, about 0.860, about 0.861, . . . , about 0.886, about 0.887, and about 0.888 g/cm$^3$. Similarly, the melt-index range can be defined by any two numbers from about 0.4, about 0.45, about 0.5, about 0.55, and about 0.6 dg/min.

In another embodiment, the foregoing low-density copolymer of ethylene and at least one $C_4$-$C_{10}$ alpha-olefin, or said at least one ultra-low density copolymer of ethylene and at least one $C_4$-$C_{10}$ alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The $C_4$-$C_{10}$ alpha-olefin also includes the cyclic counterparts.

In a preferred embodiment, the thickness of said at least one sealant layer is from about 2 microns about 20 microns. The thickness of said at least one sealant layer can be about 3, about 4, about 5, about 6, about 7, about 8, about 9, about 10, about 11, about 12, about 13, about 14, about 15, about 16, about 17, about 18, about 19, or about 20 microns.

The First and the Second Interposed Layer

In one embodiment, the multi-layer film comprises a first at least one interposed layer adjacent to an at least one inner sealant layer and to an at least one core layer on the other side, and a second at least one interposed layer adjacent to said core layer on the other side of the said first at least one interposed layer and adjacent to an at least one outer sealant layer. The inner sealant layer is externally on one side of the multi-layer film, and the outer sealant layer is externally on the other side of the multi-layer film.

The multi-layer film comprises one first interposed layer or more than one first interposed layers. For example, the multi-layer film can have two, three, or four first interposed layers stacked adjacent to each other. Similarly, the multi-layer film comprises one second interposed layer or more than one second interposed layers. For example, the multi-layer film can have two, three, or four second interposed layers.

While it may be preferred that the first interposed layer and the second interposed layer thicknesses are approximately the same, in other preferred embodiments, their thicknesses may not be the same.

Also, while it is preferred that the multi-layer film of the present invention comprises the same number of first interposed layers and the second interposed layers, in other embodiments, the number of first interposed layers may be different from the number of second interposed layers.

In this invention, the centerline of said first at least one interposed layer is closer to the centerline of said at least one inner sealant-layer than to the centerline of said multi-layer film. If more than one first interposed layers are present, then reference is made to the centerline of the combined set of first interposed layers. Similarly, if there is more than one inner sealant layer, then reference is made to the centerline of the combined set of inner sealant layers.

For this invention, the total combined thickness of said first at least one interposed layer and said second at least one interposed layer is from about 10% to about 27% of the total thickness of the multi-layer film. In other embodiments of the invention, the total combined thickness of the sealant layers can be about 11%, about 12%, about 13%, about 14%, about 15%, about 16%, about 17%, about 18%, about 19%, about 20%, about 21%, about 22%, about 23%, about 24%, about 25%, about 26% and about 27%, of the total thickness of the multi-layer film. The total combined thickness of the interposed layers can also be intermediate percentage between the percentages cited supra—for example, a total combined thickness that is from about 11.1%, about 11.2%, about 11.3%, about 11.4%, and so on and so forth between other percentages cited.

The first at least one interposed layer and the second at least one interposed layer comprise:

(i) at least one polypropylene interpolymer and an at least one polymeric compatibilizer, and at least one of:
  (a) an at least one high-density polyethylene, or
  (b) at least one ethylene-alpha-olefin copolymer; and
  (ii) optionally, a second ethylene-alpha-olefin copolymer that is not the same as said at least one ethylene-alpha-olefin copolymer in (i).

Preferably, the at least one polypropylene interpolymer may be a heterogeneous or homogeneous copolymer of polypropylene, or blend of copolymer polypropylenes and homopolymer polypropylenes. The at least one polypropylene interpolymer is in the range of from about 40 to about 95 parts by weight of said first at least one interposed layer or of said second at least one interposed layer. The range can also be defined by any two numbers from about 40, about 41, about 42, . . . , about 93, about 94, and about 95 parts. In one embodiment, to prepare a high impact strength version of the film the grade of polypropylene or blend of polypropylene(s) used is such that the izod impact strength of the PP is greater than 9 ft-lb.sub.f per inch of notch according to American Society for Testing and Materials (ASTM) standard D256.

More preferably, a particularly suitable polypropylene may be a blown-film grade, high impact copolymer with an izod impact strength (ASTM D 257, at 23.degree. C.) of from 8 to 80 ft-lb.sub.f per inch of notch, and melt flow index (ASTM D 1238, 2.16 kg, 23.degree. C.) of from about 0.3 to about 5.5 dg/min. The izod impact strength range can also be defined by any two numbers from 8, 9, 10, . . . , 78, 79, and 80 ft-lb.sub.f per inch of notch. Similarly, the melt-flow index range can also be defined by any two numbers from about 0.3, about 0.35, about 0.4, about 0.45, . . . , about 5.40, about 5.45, and about 5.50 dg/min. In a preferred embodiment, said at least one polypropylene has a melt-index in the range of from about 0.45 to about 0.75 dg/min.

In another preferred embodiment, said at least one high-density polyethylene is in the range of from about 0 to about 50 parts by weight of said first at least one interposed layer or of said second at least one interposed layer, wherein said at least one high-density polyethylene that is manufactured in a polymerization process using a single-site polymerization catalyst or a Ziegler-Natta catalyst, wherein said at least one high-density polyethylene has a density greater than 0.935 g/cm.sup.3, but less than 0.970 g/cm.sup.3 and a melt-index in the range of from about 0.75 to about 1.05 dg/min, and said at least one polymeric compatibilizer is in the range of from about 2 to about 10 parts by weight of said first at least one interposed layer or of said second at least one interposed layer. In other embodiments, the melt-index range can be defined by any two numbers from about 0.75, about 0.80, about 0.85, about 0.90, about 0.95, about 1.00, and about 1.05 d/min. Similarly, the polymeric compatibilizer range can be defined by any two numbers from about 2, about 3, about 4, about 5, about 6, about 7, about 8, about 9, and about 10 parts by weight of said first at least one interposed layer or of said second at least one interposed layer.

In another embodiment, the polymeric compatibilizer is in the range 2 to 10% by weight of the first or second at least one interposed layer. Preferably, the polymer compatibilizer may be selected from the group consisting of ethylene methacrylate, ethylene methacrylate copolymer (EMAC), ethylene butyl acrylate, ethylene vinyl acetate, ethylene propylene diamine rubber, ethylene propylene copolymer, ethylene styrene copolymer, and ethylene thermoplastic elastomers. As one skilled in the art would realize, the higher the proportion of copolymer content in an ethylene-copolymer type compatibilizer, the lower the amount of ethylene-copolymer type compatibilizer would be required. Thus by way of illustrative and non-limiting example, one may use 8% of a 20% methacrylate content EMAC or 7% of 24% methacrylate content EMAC and achieve similar degrees of compatibilization of the polymer blend in the interposed layer of the multi-layer film. More preferably, said compatibilizer may be such as, but not limited to one of ethylene methacrylate (EMA), EMAC, ethylene vinyl acetate (EVA), ethylene propylene diamine rubber (EPDM), Versify® (ethylene propylene copolymer); ethylene styrene copolymer (Index® copolymers), Engage®, Lotryl®, and/or the tie-layer polymers between PP and PE. A 20% methacrylate content EMAC is particularly convenient for use in this application. A particularly preferred compatibilizer is ethylene methacrylate copolymer with 20% or more of methacrylate content. Advantageously, when the polymer compatibilizer comprises EMAC, it may have from 10 to 25% of methacrylate content. In other embodiments, the methacrylate content range can be defined by any two numbers from about 10, about 11, about 12, . . . , about 23, about 24, and about 25%.

A material that works as a compatibilizer often also works as tie-layer resin. Any tie-layer polymer well known to a person skilled in the art as appropriate to bind PP with PE may be used. Preferably, said tie-layer polymers may be selected from the group consisting of EMA, EMAC, EVA, EPDM, Versify®; ethylene styrene copolymer (Index® copolymers), Engage®, Lotryl®, other functional copolymers or terpolymers, other ethylene propylene copolymers; anhydride- or maleic anhydride-modified linear low-density polyethylene, modified ethylene acrylate carbon monoxide terpolymers, and ethylene ethyl acrylate copolymer (EEA). A particularly preferred tie-layer resin is ethylene methacrylate copolymer with 20% or more of methacrylate content.

In another embodiment, the first or the second at least one interposed layers comprises a first at least one ethylene-alpha olefin copolymer. The ethylene-alpha olefin copolymer is in the range of from about 0 to about 15 parts by weight of said first at least one interposed layer or of said second at least one interposed layer. The copolymer is an ultra-low-density copolymer of ethylene and an at least one C.sub.4-C.sub.10 alpha-olefin manufactured in a polymerization process using a single-site polymerization catalyst, with a density in the range of from about 0.859 to about 0.905 g/cm.sup.3 and a melt-index in the range of from about 0.4 to about 1.1 dg/min. The density range can also be defined by any two numbers from about 0.859, about 0.860, about 0.861, . . . , about 0.903, about 0.904, and about 0.905 g/cm.sup.3. Similarly, the melt-index range can be defined by any two numbers from about 0.4, about 0.45, about 0.5, . . . , about 0.95, about to, about 1.05 and about 1.1 dg/min.

In another embodiment, the second ethylene-alpha-olefin copolymer is in the range of from about 0 parts to 15 parts by weight, and can be manufactured in a polymerization process using either a single-site or Zeigler-Natta polymerization catalyst, wherein said copolymer has a density in the range of from about 0.909 to about 0.935 g/cm.sup.3 and a melt-index in the range of from about 0.5 to about 1.5 dg/min. In other embodiments, the weight percent range of the second ethylene-alpha-olefin copolymer can be defined by any two numbers from about 0.0, 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5 and about 15.0 parts by weight. The density range can also be defined by any two numbers from about 0.909, about 0.910, about 0.911, . . . , about 0.933, about 0.934, and about 0.935 g/cm.sup.3. Similarly, the melt-index range can be defined by any two numbers from about 0.5, about 0.55, about 0.60, . . . , about 1.40, about 1.45, and about 1.50-dg/min. The second ethylene-alpha-olefin copolymer is not the same as the first at least one ethylene-alpha olefin copolymer described supra.

In another embodiment, the foregoing low-density copolymer of ethylene and at least one C.sub.4-C.sub.10 alpha-olefin, or said at least one ultra-low density copolymer of ethylene and at least one C.sub.4-C.sub.10 alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The C.sub.4-C.sub.10 alpha-olefin also includes the cyclic counterparts.

Figure 2:
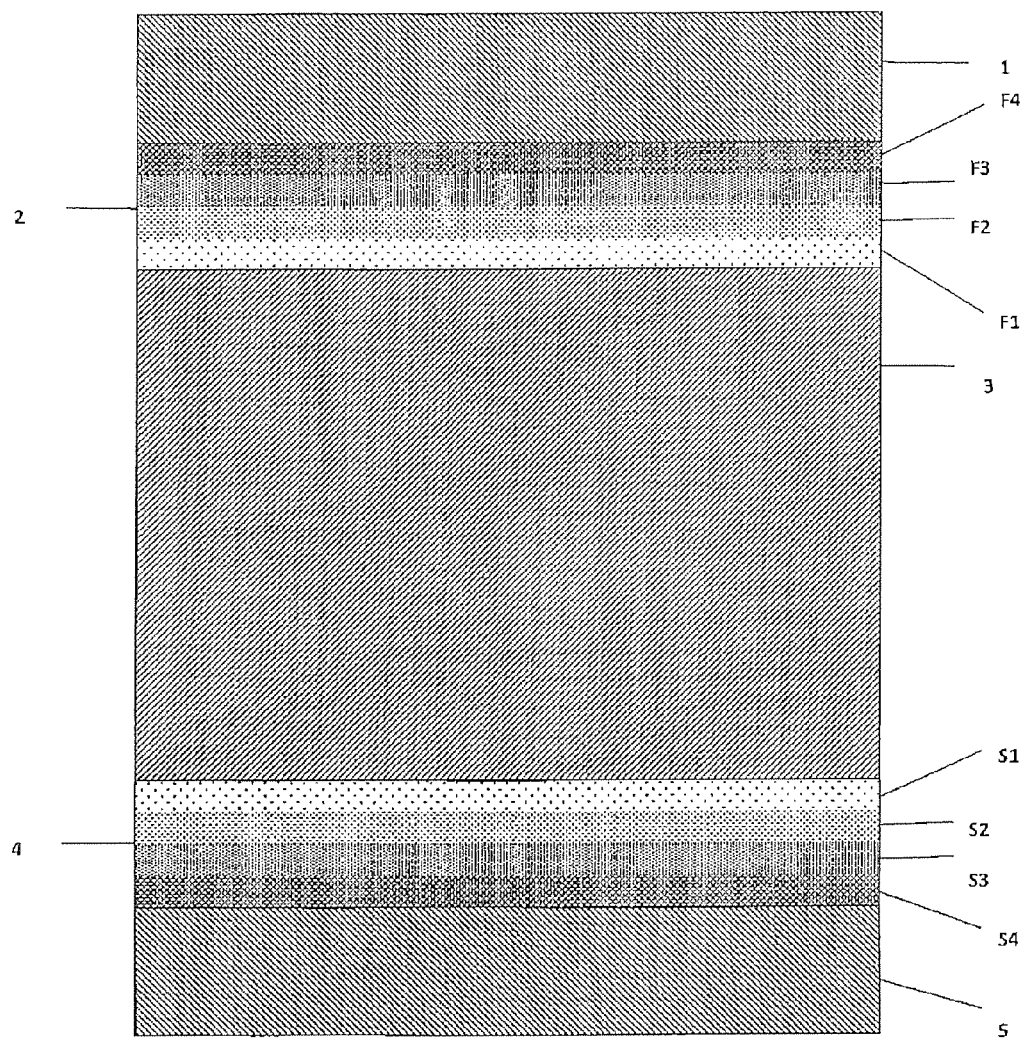
FIG. 2 shows the schematic of interposed layer having multiple layers with varying concentrations of the polypropylene polymer.

The first interposed layer and/or the second interposed layer may comprise more than one interposed layer. In one embodiment, the PP distribution will be different between the different interposed layers of the first and/or the second interposed layer in such a way that the PP concentration by its percent weight of the total weight of the specific interposed layer, increases as from the innermost interposed layer (that layer which is more proximate to the core layer) to the outermost interposed layer (that layer which is more proximate to the sealant layers. This embodiment is schematically described in FIG. 2. In FIG. 2, a multi-layer film is shown. The first and the second interposed layers, each, comprise four layers (F1, F2, F3, F4 and S1, S2, S3, S4, respectively). F1 and S1 are layers most proximate to the core layer C. Similarly, F4 and S4 are proximate to the inner sealant-layer (I) and the outer sealant layer (O). F1, for example, has 50% of PP, F2 has 70% of PP, F3 has 85% PP and F4 has 95% PP, with the added restriction that the overall concentration of PP in the first and in the second interposed layers must be about 40 to about 95 wt %. In other embodiments, the range of first component polypropylene can be defined by any two numbers from about 40, about 41, about 42, . . . , about 93, about 94, and about 95 wt %. Similarly, the second interposed layers S1-S4 can also have varying amounts of PP, increasing in concentration from 51 to S4.

In one embodiment, the thickness of the first interposed layers, for example, F1, F2, F3, and F4 is different. Similarly, the thickness of the second interposed layers, S1, S2, S3, and S4 can also be different.

In a preferred aspect of the invention relates to the fact that the use of the compatibilizer such as EMAC make the film blend more supple and pliable. This increased suppleness is due to the fact that the functional group on the compatibilizer is more bulky than the usual ethylene or propylene group. Thus introduction of this polymer into the resin blends causes the crystallized polymer in the film to be more open, and indeed, somewhat less crystalline. The net result is—all things being equal—a film that is more supple when certain compatibilizers such as for example EMAC, is/are incorporated in the film. This contributes to improved film machinability; since it allows it to pass over structures, such as the tube former or more specifically the "forming shoulders" in the VFFS machine without becoming permanently creased. Films with high levels of PP in PP-HDPE or PP-LLDPE blends tend to crease and "stress-whiten" when folded. The tendency for this permanent defect to occur in folded film is markedly less when a compatibilizer such as EMAC is included in the resin blend. Its incorporation "softens" the film without compromising unduly the strength and stiffness of the film.

In another preferred embodiment, the invention relates to the introduction of a clarifier either by the use of pre-clarified PP grade, or by separate addition, to create a clear film even when high levels of PP are present in the blend. A clearer film is desirable for the packaging of milk, liquids, and/or other flowables. The clearer film offers the consumer and packager an opportunity to assess product quality by eye. The clarifier improves the aesthetic appeal of the film without compromising the physical properties of the film. The mechanism of clarification requires that the PP layer is nucleated to such an extent that many small PP spherulites are produced upon cooling as opposed to fewer spherulites than can grow to create larger particles of PP or PP-PE blends.

A person skilled in the art will know which polypropylene clarifiers and/or nucleating agents are suitable for use. Preferably, such clarifier may be selected from the group consisting of 4-biphenyl carboxylic acid, thymine, talc, sodium benzoate or dibenzylidene-sorbitol (DBS), bis (p-methyl-dibenzylidene sorbitol) (MDBS) and related sorbitol derivatives. The amount of clarifier that may be preferably typically used is in the range of 0.05 to 0.5% by weight of the first or second at least one interposed layer. In other embodiments, the clarifier amount range can be defined by any two numbers from about 0.05, about 0.1, about 0.15, . . . , 0.40, 0.45, and 0.50% by weight.

In a preferred embodiment, the thickness of said at least one interposed layer is from about 2 microns about 20 microns. The thickness of said at least one interposed layer can be about 3, about 4, about 5, about 6, about 7, about 8, about 9, about 10, about 11, about 12, about 13, about 14, about 15, about 16, about 17, about 18, about 19, or about 20 microns.

Core Layer

The multi-layer film comprises at least one core layer that is adjacent to the first at least one interposed layer on one side and the second at least one interposed layer on the opposite side. The core layer comprising polyethylene that is selected from the group consisting of:

(i) at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

The ethylene homopolymer used in the at least one core layer, in one embodiment, is made in a high-pressure polymerization process. One or more ethylene homopolymers can be used in the core layer. In one embodiment, the weight percent of the ethylene homopolymer is from 10 to about 50 parts by weight of said at least one core layer. In other embodiments the weight percent of the ethylene homopolymer range is defined by any two numbers from about 10, about 11, about 12, . . . , about 48, about 49, and about 50 parts by weight of said at least one core layer. The ethylene homopolymer has a density in the range of from about 0.918 to about 0.923 g/cm.sup.3, and a melt-index in the range of from about 0.1 to about 1.1 dg/min. The density range can also be defined by any two numbers from about 0.918, about 0.919, about 0.920, about 0.921, about 0.922, and about 0.923 g/cm.sup.3. Similarly, the melt-index range can also be defined by any two numbers, namely, about 0.1, about 0.2, about 0.3, about 0.4, about 0.5, about 0.6, about 0.7, about 0.8, about 0.9, about 1.0, and 1.1 dg/min.

In another embodiment, more than one ethylene homopolymers may be used in one or more layers of the core layer. The number of ethylene homopolymers and the type of ethylene homopolymers may vary between any core layers. For example, a multi-layer film comprises three core layers (C1, C2, and C3). In one embodiment, C1, C2, and C3, for example, may have only one and the same ethylene homopolymer. In another embodiment, C1, C2, and C3 may have the same ethylene homopolymer. In another embodiment, for example, C1 may have two ethylene homopolymers while C2 may have three ethylene homopolymers, while C3 may have no ethylene homopolymer. Two ethylene homopolymers may differ from each other by having different densities, different melt-indices, different molecular weights, or different branch structures.

The ethylene copolymer used in the at least one core layer, in one embodiment, is made in a high-pressure polymerization process. One or more ethylene copolymers can be used in the at least one core layer. In one embodiment, the weight percent of the ethylene homopolymer is from 10 to about 50 parts by weight of said at least one inner sealant layer or said at least one outer sealant layer. The ethylene copolymer has a density in the range of from about 0.930 to about 0.960 g/cm.sup.3, and a melt-index in the range of from about 0.1 to about 10 dg/min. The density range can also be defined by any two numbers from about 0.930, about 0.935, about 0.940, about 0.945, about 0.950, about 0.955, and about 0.960 g/cm.sup.3. Similarly, the melt-index range can also be defined by any two numbers, namely, about 0.1, about 0.2, about 0.3, . . . , about 9.8, about 9.9, and about 10.0 dg/min.

In another embodiment, more than one ethylene copolymers may be used in one or more layers of the core layers. The number of ethylene copolymers and the type of ethylene copolymers may vary between any two core layers. For example, a multi-layer film comprises three core layers (C1, C2, and C3). In one embodiment, C1, C2, and C3, for example, may have only one and the same ethylene copolymer. In another embodiment, for example, C1 may have two ethylene copolymers while C2 may have three ethylene copolymers, while C3 may have no ethylene copolymer. Two ethylene copolymers may differ from each other by having different densities, different melt-indices, different molecular weights, or different branch structures.

The comonomer of ethylene in the ethylene copolymer described in the foregoing can be chosen from polar monomers such as vinyl acetate, acrylic acid, methacrylic acid, and vinyl methacrylate, wherein the ethylene copolymer is manufactured in a high-pressure polymerization process. The concentration of polar comonomer must be kept relatively low in order that the copolymer has good compatibility with the major polyethylene component of the sealant layer(s). For example, ethylene vinyl acetate copolymers should contain less than or equal to 15 wt % vinyl acetate. Otherwise, poor optical appearance, and even poor intralayer adhesion, can result.

In another embodiment, the at least one core layer comprises at least one low-density ethylene-alpha-olefin copolymer, which may be found alone or in a blend form with an ethylene homopolymer described supra, or ethylene copolymer described supra. Such low-density ethylene alpha-olefin copolymer, in a preferred embodiment, is found as a copolymer that is from about 35 to about 85 parts by weight of the at least one core layer weight. The copolymer range can also be defined by any two numbers from about 35, about 36, about 37, . . . , about 83, about 84, and about 85 parts by weight of the at least one core layer weight. The copolymer is a low-density copolymer of ethylene and an at least one C.sub.4-C.sub.10 alpha-olefin manufactured in a polymerization process using a single-site polymerization catalyst, with a density in the range of from about 0.909 to about 0.935 g/cm.sup.3 and a melt-index in the range of from about 0.5 to about 1.5 dg/min. The density range can also be defined by any two numbers from about 0.909, about 0.910, about 0.911, . . . , about 0.933, about 0.934, and about 0.935 g/cm.sup.3. Similarly, the melt-index range can be defined by any two numbers from about 0.5, about 0.6, about 0.7, . . . , about 1.3, about 1.4, and about 1.5 dg/min. In addition, said embodiment further comprises, from about 0 to about 15 parts by weight of an additional at least one low-density copolymer of ethylene and an at least one C.sub.4-C.sub.10 alpha-olefin. In other embodiments, the weight percent range can be defined by any two numbers from about 0.0, 0.5, about 1.0, about 1.5, about 2.0, about 2.5, about 3.0, about 3.5, about 4.0. about 4.5, about 5.0, about 5.5, about 6.0, about 6.5, about 7.0, about 7.5, about 8.0, about 8.5, about 9.0, about 9.5, about 10.0, about 10.5, about 11.0, about 11.5, about 12.0, about 12.5, about 13.0, about 13.5, about 14.0, about 14.5 and about 15.0 parts. Said additional at least one low-density copolymer is an ultra-low density copolymer of ethylene and said at least one C.sub.4-C.sub.10 alpha-olefin, manufactured in a polymerization process using a single-site polymerization catalyst, with a density in the range of from about 0.859 to about 0.905 g/cm.sup.3 and a melt-index in the range of from about 0.4 to about 1.1 dg/min. Similarly, the density range can also be defined by any two numbers from about 0.859, about 0.860, about 0.861, . . . , about 0.903, about 0.904, and about 0.905 g/cm.sup.3. Similarly, the melt-index range can be defined by any two numbers from about 0.4, about 0.45, about 0.50, . . . , about 1.0, about 1.05, and about 1.10 dg/min.

In another embodiment, the foregoing low-density copolymer of ethylene and at least one C.sub.4-C.sub.10 alphaolefin, or said at least one ultra-low density copolymer of ethylene and at least one C.sub.4-C.sub.10 alpha-olefin is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

The C.sub.4-C.sub.10 alpha-olefin also includes the cyclic counterparts.

Therefore generally, the present invention also provides a multilayer film formed from a layer of a sealant film and a layer of a film having a higher stiffness than the sealant layer, said layer of higher stiffness being formed from a polymer blend involving polypropylene, polyethylene and a polymeric compatibilizer.

In preferred embodiments of the multilayer film of the present invention, the film has a stiffness of at least 20 000 psi (approximately 135 MPa), and especially at least 25 000 psi (approximately 170 MPa). In other embodiments, the multilayer film has a stiffness of at least 21,000 psi, 22,000 psi, 23,000 psi, or 24,000 psi.

The present invention also provides a pouch containing a flowable material, said pouch being made from the previously described multi-layer film in tubular form and having transversely heat sealed ends.

The present invention further provides a process for making pouches filled with a flowable material, using a vertical form, fill and seal ("VFFS") apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of a film made from a multilayer film described previously. The VFFS processes and its modifications are described in U.S. Pat. No. 5,538,590 and are incorporated by reference herein in their entirety.

Although melt-index ranges are specified herein, it is understood that the polymers have melt indices typical of film-grade polymers.

The multi-layer films of the present invention have the ability to form a lap seal as well as a fin seal. They also substantially reduce the curl in the laminate.

Catalysts

In the present invention, linear ethylene based polymers, copolymers, terpolymers, etc. are made using the Ziegler-Natta catalysts, single-site catalysts, the metallocene catalysts, or a combination of such catalysts, depending upon the need for the type of polymer.

High pressure low density polyethylene, or HP-LDPE, was the original polyethylene to be polymerized from ethylene monomer. The "high pressure" refers to the rather extreme polymerization process conditions. Generally, "low density" refers to the 0.918-0.930 g/cm$^3$ range of polyethylene densities. The HP-LDPE molecules have complex branching patterns, with no easily distinguishable backbone. The polymer molecules are composed of a whole network of branches of various lengths from short to long. The present invention makes use of HP-LDPE polymers which are relatively high in average molecular weight, in other words, low in melt-index (0.1-1.1 dg/min).

Development of the Ziegler-Natta catalysts allowed polyethylene (and polypropylene) to be polymerized under less extreme conditions, and, in particular, at lower pressures. The first Zeigler-Natta-catalyzed polyethylene was distinctly different from HP-LDPE in two ways: the molecules were very linear in nature, with essentially no branches, and the polyethylene could have a very high density (≈0.960 g/cm$^3$) because the linear molecules could pack together closely to form extensive crystalline domains in the solid polymer.

High density polyethylene, in general, has a density of at least 0.935 g/cm$^3$ but, in this invention, the HDPE must have a density of greater than 0.950 g/cm$^3$ in order to provide sufficient stiffness, but less than or equal to about 0.970 g/cm$^3$. In other embodiments of the invention, the HDPE density is within the range defined by any two numbers from about 0.950, about 0.951, about 0.952, . . . , about 0.968, about 0.969, and about 0.970 g/cm$^3$. In addition, the high density polyethylene has a melt-index of less than 1.05 dg/min, but more than 0.3 dg/min. HDPE in the melt-index range of 0.01 to 0.3 dg/min, which is generally classified as high molecular weight high density polyethylene, HMW-HDPE, has melt flow characteristics, which are unsuitable in the present invention. In other embodiments, the HDPE has a melt-index in the range defined by any two numbers from about 0.3, about 0.35, about 0.40, . . . , about 0.95, about 1.00, and about 1.05 dg/min.

As the use of Zeigler-Natta catalysts continued, it was discovered that the density of the linear polyethylene could be controlled and lowered by introducing a comonomer, in addition to the ethylene, for example, butene, hexene or octene. In fact, any low molecular-weight alpha-olefin suitably reacts with ethylene and breaks up the regularity of the linear chain development during polymerization—the alpha-olefin double bond at the end of the molecule opens up as it reacts, allowing the carbons on either side to become part of the linear back-bone, with the remainder of the alpha-olefin molecule becoming a short side chain. The short side chain disrupts polymer crystallization and lowers density: the more side chains that are present, the lower the polymer density.

Processes for the commercial manufacture of linear polyethylene have been known for more than thirty years. Such processes may be operated at temperatures above the solubilization temperature of the polymer in which event the polymer remains in solution, or the processes may be operated below the solubilization temperature in which event the polymer remains as a slurry in the polymerization solvent. Processes are also known in which the polymerization is conducted in the gas phase in the absence of solvent. The catalysts used are frequently based on titanium and are referred to as coordination catalysts; such catalysts may also be described as multi-site catalysts or heterogeneous catalysts. The polymer obtained is linear in nature, as opposed to the branched nature of high pressure polyethylene. Linear low density polyethylene is obtained by the co-polymerization of ethylene with at least one $C_4$-$C_{10}$ alpha-olefin hydrocarbon comonomer, examples of which include butene-1, hexene-1 and octene-1. The linear low density polyethylene has a density in the range of 0.909 to 0.935 g/cm$^3$, preferably 0.912 to 0.930 g/cm$^3$ and especially in the range of 0.912 to 0.926 g/cm$^3$. In other embodiments, the linear low density polyethylene has a density in the range defined by any two numbers from about 0.909, about 0.910, about 0.911, . . . , about 0.933, about 0.934, and about 0.935 g/cm$^3$. In addition the polymer has a melt-index in the range of 0.3 to 10.0 dg/min, preferably 0.3 to 2.0 dg/min and especially in the range of 0.5 to 1.5 dg/min. In other embodiments, the melt-index is in the range defined by any two numbers from about 0.3, about 0.4, about 0.5, . . . , about 9.8, about 9.9, and about 10.0 dg/min.

Figure 6:
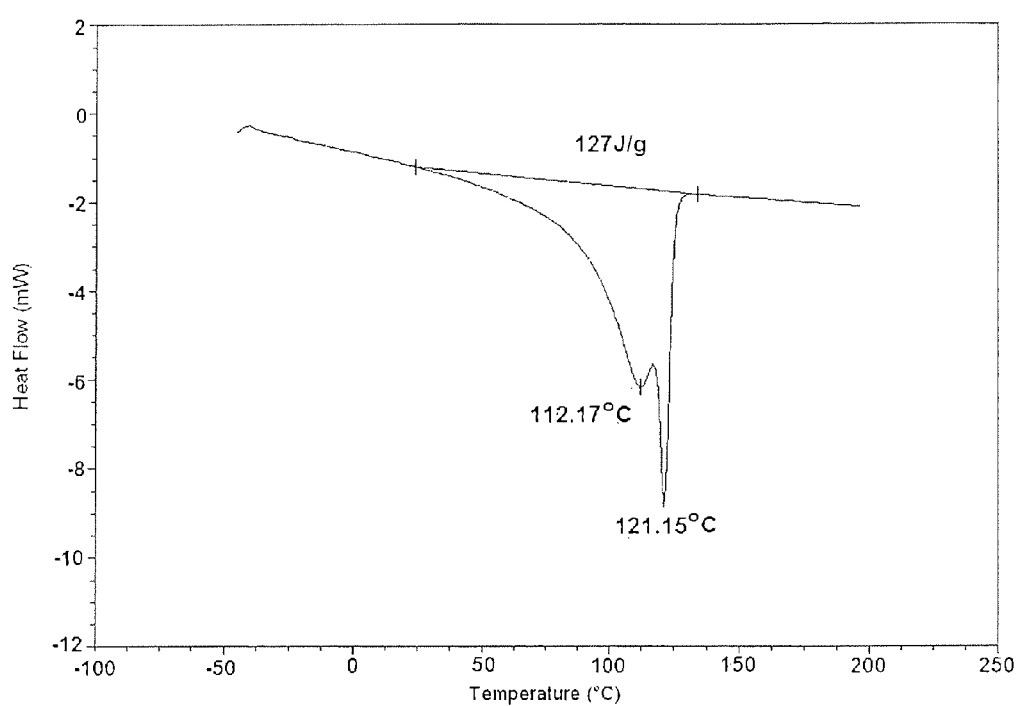
FIG. 6 shows the DSC melting curve for a heterogeneous LLDPE polymer polymerized using a traditional Zeigler-Natta catalyst.

Traditional Ziegler-Natta catalysts produce heterogeneous LLDPE polymers. This is because both the molecular weight and the extent of comonomer incorporation vary considerably from molecule to molecule. The heterogeneity of the Zeigler-Natta polymerized LLDPE polyethylene can be detected from the relatively broad, multi-peak, DSC melting (or freezing) curve, as illustrated in FIG. 6. The peak melting is observed at about 125.degree. C. with a lower-temperature broader peak. High molecular weight molecules with very little incorporated comonomer produce the major peak (very similar to the original linear polyethylene homopolymer). Melting copolymers (with a wide range of molecular weights and comonomer contents) produce the broader peak. The lowest melting portion, also known as the grease fraction, comprises low molecular-weight molecules. Low molecular-weight molecules incorporate higher number of comonomers that increases branch concentration. The grease fraction lubricates the higher molecular-weight linear polyethylene, improving its extrudability. As the grease fraction increases, however, the polymer clumps-together impeding the pelletized polymer flow. Therefore, the use of Zeigler-Natta-catalyzed polyethylene has generally been limited to higher than 0.912 g/cm$^3$ density polymers.

It was theorized that different Zeigler-Natta catalyst sites encouraged growth of different types of polymer chains resulting in heterogeneous polyethylene. Therefore, single site catalysts were developed, which would produce homogeneous LLDPE polymers, which were more uniform with respect to molecular weight distribution and comonomer incorporation. Thus, polyethylene densities as low as 0.880-0.965 g/cm.sup.3 are now possible. However, the latest expansion of the density range (below about 0.912 g/cm.sup.3) has taken place only since the development of the single-site catalyst, also known in some versions as the Metallocene catalyst.

Figure 7:
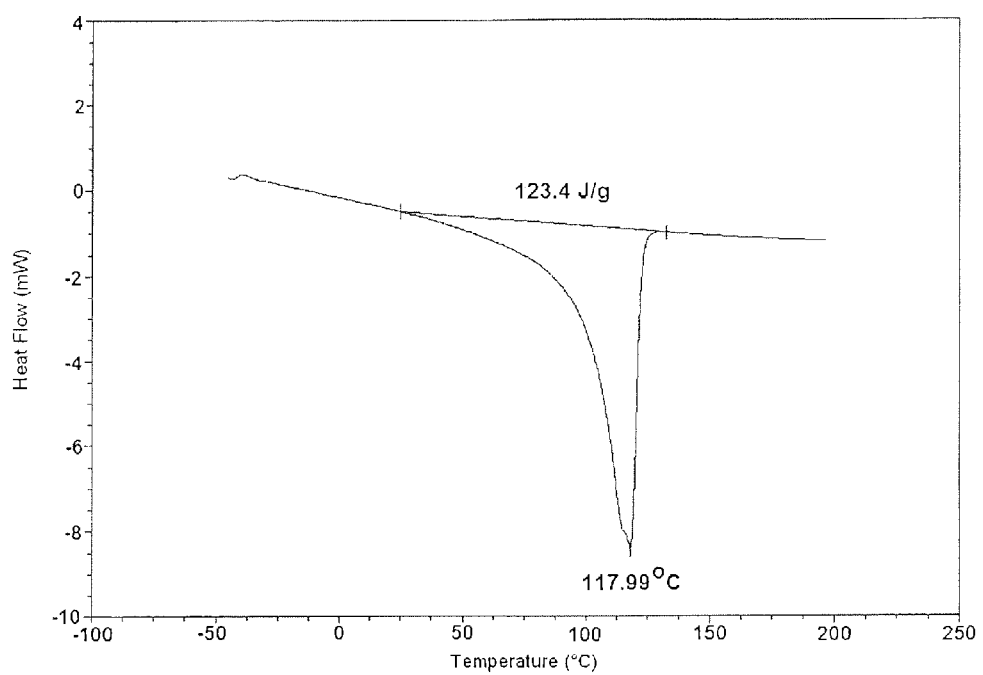
FIG. 7 shows the DSC melting curve for a homogeneous LLDPE polymer polymerized using a single site catalyst.

U.S. Pat. No. 3,645,992 describes single-site catalysts capable of producing homogeneous polyethylenes. The homogeneity occurs because the molecules are much more similar to one another in terms of molecular weight and comonomer concentration. In other words, the high-molecular weight tail and the grease fraction are both largely eliminated with the DSC melting curve showing a single melting peak, as a result, as illustrated in FIG. 7. Cleanly flowing pellets, with no greasy feel, could be produced with densities as low as 0.880 g/cm.sup.3. These catalysts are called single-site catalysts because all catalyst sites encourage the growth of relatively similar polymer chains.

"Single-site catalysts" include metallocene or constrained-geometry catalysts. Metallocene catalysts are organometallic co-ordination compounds obtained as a cyclopentadienyl (Cp) derivative of a transition metal or metal halide. The metal bonds to the Cp ring by electrons moving in orbitals extending above and below the plane of the ring (pi-bond). Metallocene catalysts systems are extremely sensitive to the geometry of the catalytic site at the transition metal (the "single-site"). Examples of single-site catalysts include Cp.sub.2TICl.sub.2, Cp.sub.2ZrCl.sub.2, Cp.sub.2HfCl.sub.2, (C.sub.5(CH.sub.3).sub.2).sub.3TiCl.sub.2, PH, Me(Ind).sub.2ZrCl.sub.2, [Me.sub.4CpSi(Me).sub.2N(t-Bu)]TiCH.sub.2[o-PhN (Me.sub.2)], Cp.sub.2FeB(C.sub.2F.sub.2).sub.4.

The ethylene copolymer made with single-site catalyst may be obtained using a variety of polymerization processes of the type described above for the manufacture of linear low density polyethylene, for example, processes that operate in solution, in the gas phase and as a slurry process; references to the use of single site catalysts in polymerization processes is made in Modern Plastics, p. 15, May 1993, Plastics Focus Vol. 25, No. 12, Jun. 21, 1993 and in Exxon Chemical Exact Facts, Vol. 1, No. Feb. 1, 1993. Such polymers are obtained by the copolymerization of ethylene with at least one C.sub.4-C.sub.10 alpha-olefin hydrocarbon comonomer, examples of which include butene-1, hexene-1, and octene-1. The catalyst used is a so-called single-site catalyst, certain of which may also be referred to as metallocene or constrained geometry catalysts.

In the present invention, if the linear polyethylene obtained with the single site catalyst is a low-density copolymer of ethylene and an at least one C.sub.4-C.sub.10 alpha-olefin, then it has a density in the range of 0.905 to 0.935 g/cm.sup.3, preferably in the range 0.909 to 0.930, and especially in the range 0.912 to 0.926 g/cm.sup.3. In other embodiments, the density range can be defined by any two numbers from about 0.905, about 0.906, about 0.907, . . . , about 0.933, about 0.934, and about 0.935 g/cm.sup.3. In addition the low density copolymer has a melt-index in the range of 0.3 to 10.0 dg/min, preferably 0.3 to 2.0 dg/min and especially in the range of 0.5 to 1.5 dg/min. In other embodiments, the melt-index is in the range defined by any two numbers from about 0.3, about 0.4, about 0.5, . . . , about 9.8, about 9.9, and about 10.0 dg/min.

If the linear polyethylene is used as a minor blend component, and is an ultra-low-density copolymer of ethylene and an at least one C.sub.4-C.sub.1. alpha-olefin, then it preferably has a density in the range of 0.8 to 0.909 g/cm.sup.3, moreover in the range of 0.859 to 0.905 g/cm.sup.3, and especially in the range of 0.859 to 0.888 g/cm.sup.3. In other embodiments, the density range can be defined by any two numbers from about 0.800, about 0.801, about 0.803, . . . , about 0.907, about 0.908, and about 0.909 g/cm.sup.3. In addition, the ultra-low-density polymer preferably has a melt-index of less than 5 dg/min, particularly in the range of 0.4 to 1.1 dg/min and especially in the range of 0.4 to 0.6 dg/min. In other embodiments, the melt-index is in the range defined by any two numbers from about 0.4, about 0.5, about 0.6, . . . , about 0.9, about 1.0, and about 1.1 dg/min. In either case, the preferred copolymers include ethylene/butene-1, ethylene/hexene-1, ethylene/octene-1 and ethylene/hexene-1/butene-1 terpolymers.

Polypropylene is also polymerized using Zeigler-Natta, or single-site catalysts, or combinations of these catalysts.

Figure 3:
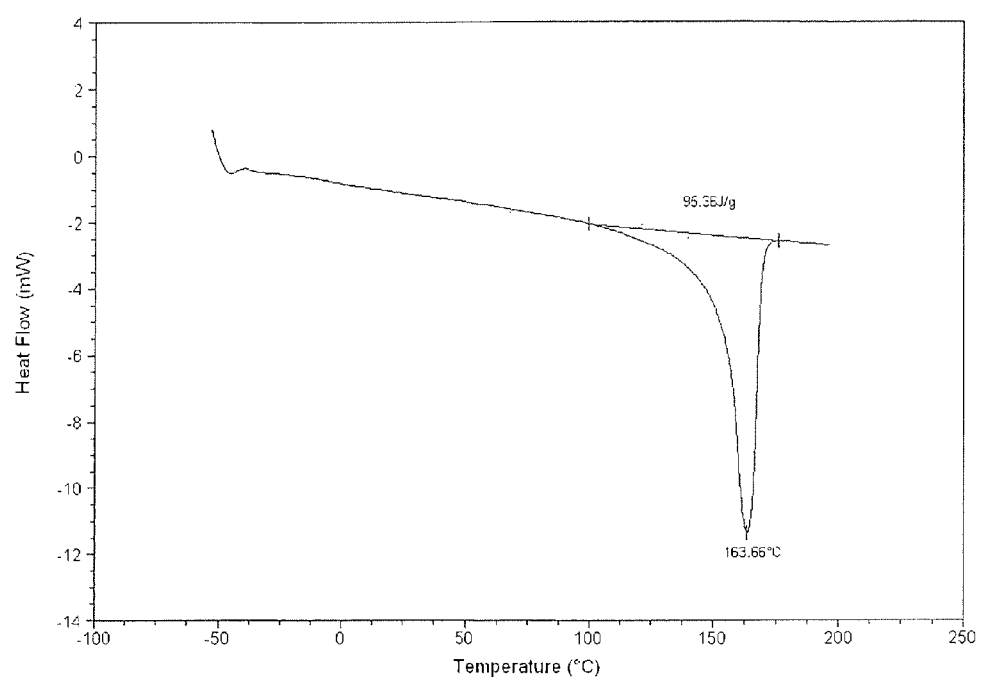
FIG. 3 shows DSC melting peak in the region 160-165.degree. C. for isotactic polypropylene homopolymer ("homoPP").

Isotactic polypropylene homopolymer ("homoPP") is a homogeneous polymer normally polymerized in a single stage reaction. It has a single clean DSC melting peak in the region 160-165.degree. C. as illustrated in FIG. 3 of the accompanying drawings.

Figure 4:
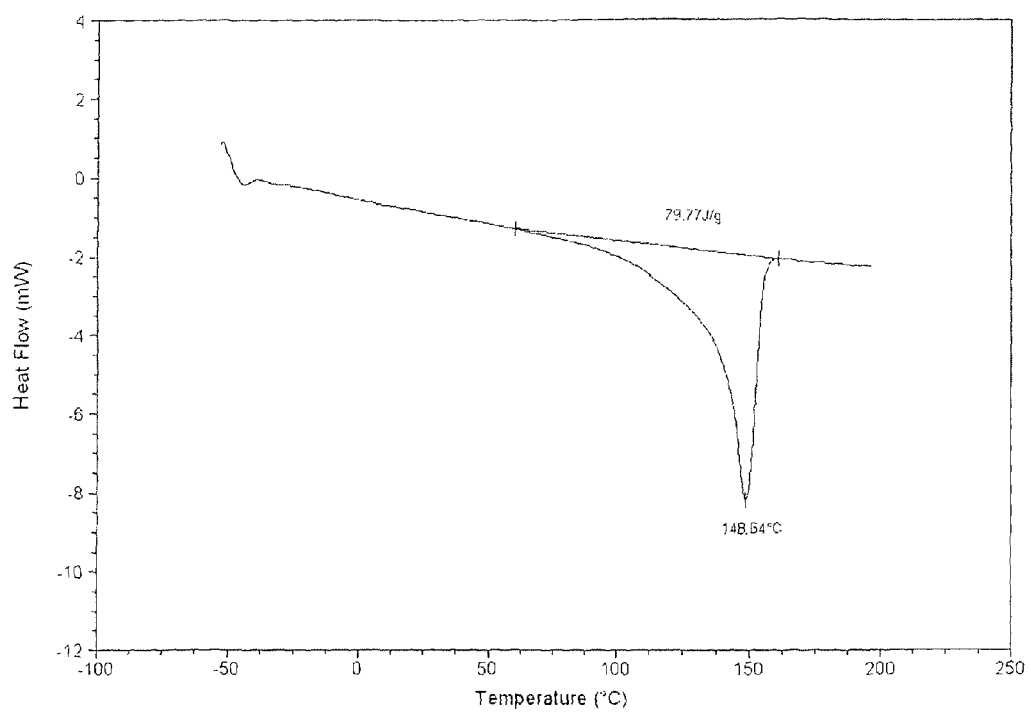
FIG. 4 shows DSC melting curve for a homogeneous propylene-ethylene interpolymer ("HOPI").

Homogeneous polypropylene interpolymers ("HOPI") also consist of a single phase, and have a single clean DSC melting peak, which occurs at a lower temperature than that of the homopolymer. The energy of melting of the homogeneous interpolymer is also somewhat lower than that of the homopolymer. A typical DSC melting curve for a homogeneous propylene-ethylene interpolymer is illustrated in FIG. 4 of the accompanying drawings.

Figure 5:
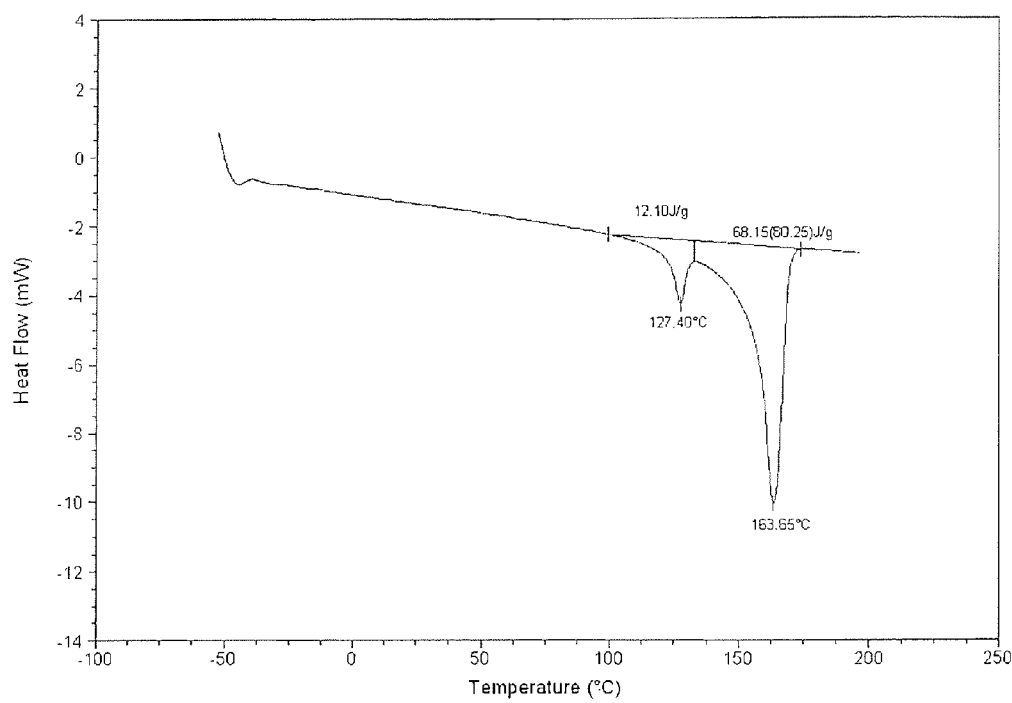
FIG. 5 shows the third-phase DSC melting peak in the 120-125.degree. C. region of a heterogeneous polypropylene interpolymer, wherein the comonomer is ethylene ("HEPI").

Heterogeneous polypropylene interpolymers ("HEPI") are formed in a two stage reaction. In the first stage, a crystalline network of isotactic polypropylene homopolymer or homogeneous polypropylene interpolymer is formed. In the second stage, a largely amorphous rubbery phase is formed within the crystalline network. A portion of the polymer formed in the second stage reaction is normally rich enough in comonomer, to be able to crystallize to form a third phase. When the comonomer is ethylene, the third phase normally has a DSC melting peak in the 120-125.degree. C. region as illustrated in FIG. 5 of the accompanying drawings.

The blends useful in the present invention may be made by blending the constituents prior to feeding to the hopper of a film extruder, or may be made by blending the constituents at the time of extrusion just prior to remelting in the extruder, or alternatively the constituents may be melt blended in the extruder.

The ethylene/alpha-olefin copolymer or blend of ethylene/alpha-olefin copolymers, for example, in pellet form, may be extruded into film form using known techniques. One preferred method of manufacturing film is the so-called blown film process. The film, after manufacture, is slit longitudinally into appropriate widths. The width is selected on the basis of the diameter of the tube to be formed on the vertical form, fill and seal apparatus. The preferred method of manufacture of a multilayer film is by using a blown film co-extrusion process, although other methods of manufacture of the film may be used.

The multilayer film of the invention is particularly useful in the formation of pouches, especially using a form, fill and seal apparatus. The pouches of the present invention may be used in the packaging of flowable materials, for example, liquids, as defined above. In particular, the pouches may be used in the packaging of milk.

In particular, the multilayer film provides increased stiffness, compared to the monolayer sealant film, increased clarity compared to HDPE film, increased sealability and toughness compared to PP film, and further improves efficiencies in the runnability and sealability of monolayer and prior art multilayer films as described herein.

Other Additives

In the present invention, sealant layers can have a combined weight of 0-10 wt % of extrusion aid masterbatches including slip, antiblock and process aid. Interposed layers and core layers can have 0-2 wt % of slip masterbatches.

It will be understood by those skilled in the art that additives such as antioxidants, UV stabilizers, anti-block agents, and slip additives, may be added to the polymers from which the pouches of the present invention are made. Optionally, the inner-sealant layer, the outer-sealant layer, the core and/or the first or the second interposed layer may further comprise one or several additives useful to make easier the processing of a film in a VFFS system, such as, for example, polymer processing aid concentrate, and/or slip/antiblock concentrates. Any of such additives well known to person skilled in the art can be used. Advantageously, the following additives are particularly preferred.

Slip Agent

The preferred range of the slip agent is from about 200 to 2000 ppm. A preferred slip agent is erucamide or other fatty acid amide such as oleamide. The slip agent lowers the coefficient friction of the film and allows it to slide readily over various surfaces.

Anti-Blocking Agent 1000 to 5000 ppm of any film anti-blocking agent well known to skilled workman maybe added to the film layers. Preferably from 1000 to 8000 ppm of an anti-blocking material such as diatomaceous earth, synthetic silica or talc will be added to the inner and outer layers of the film. The anti-blocking material is particularly useful in reducing the coefficient of friction between the film and the metallic surfaces over which the film is drawn during the VFFS process.

Processing Aid 50 to 1000 ppm of any processing aid well known to skilled workman, preferably and not limitatively containing a fluoro-elastomer based polymer may be added to outer and inner skin layers of the film.

Pouch-Making Processes

Pouch-making processes for VFFS are known in the art, for example, U.S. Patent Publication No. 2007/0254119, which is incorporated by reference herein. The invention at hand also relates to a process for making pouches filled with a flowable material, generally using a VFFS apparatus, wherein each pouch is made from a flat web of film by the following steps:

(I) forming a tubular film therefrom with a longitudinal seal and subsequently flattening said tubular film at a first position;

(II) transversely heat-sealing said tubular film at the flattened position;

(III) filling said tubular film with a predetermined quantity of flowable material above said first position;

(IV) flattening said tubular film above the predetermined quantity of flowable material at a second position; and (V) transversely heat sealing said tubular film at said second position, wherein said pouches are made from a flat web of film made from a multi-layer film, comprising the following layers in order of an at least one inner sealant-layer to an at least one outer sealant-layer:

(A) said at least one inner sealant-layer comprising polyethylene that is selected from the group consisting of:

(i) an at least one low-density ethylene-alpha-olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(B) a first at least one interposed layer adjacent to said at least one inner sealant-layer, said first at least one interposed layer comprising:

(i) an at least one polypropylene interpolymer and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (B)(i)(b);

wherein the centerline of said first at least one interposed layer is closer to the centerline of said at least one inner sealant-layer than to the centerline of said multi-layer film;

(C) at least one core layer, adjacent to said first at least one interposed layer, said at least one core layer comprising polyethylene that is selected from the group consisting of:

at least one low-density ethylene-alpha olefin copolymer, (ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process;

(D) a second at least one interposed layer adjacent to said at least one core layer, said second at least one interposed layer comprising:

(i) an at least one polypropylene interpolymer and an at least one polymeric compatibilizer, and at least one of:

(a) an at least one high-density polyethylene, or (b) at least one ethylene-alpha-olefin copolymer; and (ii) optionally, a second ethylene-alpha-olefin copolymer that is not the same as said at least one ethylene-alpha-olefin copolymer in (D)(i)(b);

wherein the centerline of said second at least one interposed layer is closer to the centerline of said at least one outer sealant-layer than to the centerline of said multi-layer film; and (E) said at least one outer sealant-layer, comprising polyethylene that is selected from the group consisting of:

(i) an at least one low-density ethylene-alpha-olefin copolymer;

(ii) a blend of said at least one low-density ethylene-alpha-olefin copolymer and an at least one ethylene homopolymer, wherein said ethylene homopolymer is made in a high-pressure polymerization process; and (iii) a blend of said at least one low-density ethylene-alpha-olefin copolymer and an at least one ethylene copolymer, wherein said ethylene copolymer is made in a high-pressure polymerization process; wherein said multi-layer film thickness is in the range of from about 35 microns to about 66 microns; wherein a combined thickness of said first at least one interposed layer and said second at least one interposed layer is in the range of from about 10% to about 27% of the total thickness of said multi-layer film; and wherein a combined thickness of said inner sealant-layer and said outer sealant-layer is in the range of from about 10% to about 27% of the total thickness of said multi-layer film.

ABBREVIATIONS

BUR Blow-up ratio
EMA Ethylene methacrylate
EMAC Ethylene methacrylate copolymer
EPDM Ethylene propylene diamine rubber
EVA Ethylene-vinyl acetate
HDPE High-density polyethylene
HEPI heterogeneous polypropylene interpolymer
homoPP homopolymer polypropylene polymerized solely from propylene monomer
HOPI homogeneous polypropylene interpolymer
HP-LDPE High-pressure, low-density polyethylene
LLDPE linear low-density polyethylene
MWD/SCBD Molecular weight/Short-chain branching distribution
PP Polypropylene
ULDPE Ultra low-density polyethylene
VA Vinyl acetate
PI polypropylene interpolymer polymerized from propylene and at least one additional alpha-olefin monomer
VFFS Vertical Form, Fill, and Seal

EXPERIMENTAL

In the present set of experiments, generally, a multi-layer film is made using film extrusion processes that are well-known to the film manufacturing industry. The multi-layer film is extruded on a five-layer blown-film co-extrusion line. Films from the resin compositions of this invention can also be made using other film extrusion processes which are well-known to the film manufacturing industry.

In one embodiment of the invention, which is a five-layer multi-layer film, the inner sealant-layer is designated as Layer A, the first interposed layer is designated as Layer B, the core layer is designated as Layer C, the second interposed layer is designated as Layer D, and the outer sealant-layer is designated as Layer E.

Three extruders ($E_A$, $E_B$, $E_C$) feed an eight-inch diameter circular die used for preparing the film. Extruder $E_A$ feeds the outer sealant-layer (Layer E) and the inner sealant-layer (Layer A). The "sealant layer" extruder, $E_A$, is a 2-inch diameter, single-screw extruder. Extruder $E_C$ feeds the first interposed layer (Layer B), and the second interposed layer (Layer D). The "interposed layer" extruder, $E_C$, is also a 2-inch diameter, single-screw extruder. Extruder $E_B$ feeds the core layer (Layer C). The "core layer" extruder $E_B$ is a larger 4-inch diameter, single-screw extruder.

The co-extrusion line includes an oscillating nip, a corona-treater, an edge guide, and a back-to-back winder with slit-in-line that is capable of being surface-driven or centre-driven. The width of the tower nip and winder also allow for blow-up ratios ("BUR") up to about 4:1. Preferably, the BUR range from 1.5 to 2.8, which provides a stable process and good film quality. The melt processing temperatures of the resins in the extruders ranged from 150.degree. C. to 260.degree. C. Processing additives such as slip and antiblock are incorporated into the resins as supplied or otherwise dry-blended in the form of additive concentrates, or melt-compounded into the resins through melt-compounding processes.

In one embodiment, the films are made at a BUR of 2:1. The films are wound as a flattened tube and slit to a narrower width.

For illustrative purposes, films with 12 different EXAMPLE resin recipes are manufactured on the co-extrusion line as described. The films are made with a total thickness of 52 microns and the following layer thicknesses: A=4 microns, B=6 microns, C=32 microns, D=6 microns and E=4 microns.

The films are run on the Prepac IS-7E filler to assess runnability, to make pouches for evaluating in a pitcher, and to make pouches for a pouch drop test. Pouches are made from the above-described multi-layer films (also see multi-layer film formulations, infra) using the VFFS process. It is normal to make pouches containing 1.3 liters of water, at a temperature of 4.0+/−0.5.degree. C., from a 24-cm wide film web; however, it is possible to make other pouch sizes if this is more relevant to the specific end-use. The Prepac IS-7E vertical form, fill and seal apparatus is normally equipped with an insulated transverse sealing jaw (U.S. Pat. No. 5,538,590) and easy mount transverse sealing element (PCT/CA98/00066 or equivalent). The web of film is formed into a continuous tube with a lap seal, said tube having an inside diameter of approximately 9.8 cm. The operation of the vertical and transverse sealing elements should be optimized for the particular film type and thickness used. It will be recognized that the sealing conditions (for example, amperage, voltage, dwell time) depend on the gauge and melting characteristics of the film. For example, a 50.mu.m film would require lower amperage and/or voltage, as controlled by the rheostat on the apparatus, than would a 75.mu.m film. Typically such a change in film thickness requires an adjustment of approximately 10% of the rheostat range.

The drop test can be a constant height pouch drop test, or a Bruceton stair drop test, where the drop height is varied in a systematic way. Both procedures are adaptations of ASTM D5276: Drop Test of Loaded Containers by Free Fall. It should be verified that the pouches in the different batches have very similar mean and standard deviation values for weight, length, and headspace.

Constant Height Drop Test (Version of ASTM D5276 A2.2.1)

To compare the performance of one pouch film against another, at least 200 well-made pouches should be manufactured from each film and dropped from a constant initial height in the range 10-15 feet. The pouches should be dropped before the water in them has had a chance to warm up appreciably. Each pouch is positioned with the longitudinal axis of the tube i.e. pouch, coincident with an imaginary horizontal line, the bottom surface of the pouch at the initial drop height, and the vertical seal facing upwards. In this orientation, the pouch is dropped onto a stainless steel sheet, and then inspected visually and tactilely for leakers. Any pouch, from which water flows or weeps after the pouch has been dropped, is termed a "leaker". The number of leakers, expressed as a percentage of the total number of pouches dropped is the M(1.3)-test value for the particular film being tested, where 1.3 denotes the pouch size in liters.

Bruceton Stair Drop Test (Version of ASTM D5276 A2.4.2)

The Bruceton Stair test is more discriminating, and requires only 40-50 well-made pouches. The first pouch is positioned with the longitudinal axis of the tube i.e. pouch, coincident with an imaginary horizontal line, the bottom surface of the pouch at a suitable initial drop height, say 8 feet, and the vertical seal facing upwards. In this orientation, the pouch is dropped onto a stainless steel sheet, and then inspected visually and tactilely for leakers.

If the first pouch survives the drop test intact without leaking water, then a new pouch is selected and dropped from a height of an additional 0.5 feet, that is, 8.5 feet. On the other hand, if the first pouch is a leaker, then a new pouch is selected and dropped from a height, which is lower by 0.5 feet, that is 7.5 feet. The testing continues, using a new pouch for every drop, until at least 5 passes and 5 failures have occurred in the height range where both passes and failures are occurring. The 50% failure height is then calculated using the statistical method of ASTM D5628.

Extrusion Aid Masterbatches

For the experimental examples described below, extrusion aids such as slip and anti-block are purchased as pelletized masterbatches from Ingenia Polymers (Houston, Tex.). The active ingredient is compounded into a polyethylene carrier resin, usually a 2-10 MI LLDPE resin.

TABLE A

| Masterbatch | Active Ingredient | Concentration | Function |
|---|---|---|---|
| Ingenia IP1065 | Erucamide | 5 wt % | slip |
| Ingenia IP1061A | oleamide | 5 wt % | slip |
| Ingenia IP1142 | fluoropolymer cpd | 4 wt % | |
| Ingenia IT719 | talc | 30 wt % | |
| Ingenia IP1051 | silica | 25 wt % | |

A pellet blend of the major polyolefin resins, and these masterbatches, is fed to each extruder of the co-extrusion line. The various components of the pelletized mixture are fed into the main extruder hopper via satellite blenders, the rates of which can be set to achieve the desired mix ratio.

Example 1

Layers of the Multi-layer Film 1 are prepared with the resins and additives shown in Table 1.

TABLE 1

| Resin Grade/Trade Name | Supplier | Weight % of Layer | Polymer Type | Comonomer | Catalyst in Resin Manufacture | MWC/SCBD | Resin Destiny; g/cm$^3$ | Melt-index deci g/min |
|---|---|---|---|---|---|---|---|---|
| *Inner & Outer Sealant-Layer (A & E); Extruder $E_A$* | | | | | | | | |
| Surpass FPs117C | Nova | 72.5 | LLDPE | Octene | Single Site | Homogeneous | 0.917 | 1.00 |
| MarflexD350 | Chevron-Phillips | 25.0 | LLDPE | Hexane | Single Site | Honogeneous | 0.933 | 0.90 |
| IP1065 | Ingenia | 1.8 | LLDPE carrier | — | — | — | 0.920 | 2-10MI carrier |
| IT 719 | Ingenia | 0.7 | LLDPE carrier | — | — | — | 1.140 | 2-10MI carrier |
| *First & Second Interposed-Layer (B & D); Extruder $E_C$* | | | | | | | | |
| Inspire PP D114 | Dow | 87.2 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Affinity PL 1880 | Dow | 3.0 | ULDPE | Octene | Single Site | Homogeneous | 0.902 | 1.0 |
| IP1065 | Ingenia | 1.8 | LLDPE carrier | — | — | — | 0.920 | 2-10MI carrier |
| *Core-Layer (C); Extruder $E_B$* | | | | | | | | |
| Surpass FPs117C | Nova | 79.2 | LLDPE | Octene | Single Site | Homogeneous | 0.917 | 1.00 |
| EquistarNA960 | Lyondell-Basell | 10.0 | HP-LDPE | None | High Pressure | Heterogeneous | 0.919 | 1.0 |
| Affinity PL1880 | Dow | 9.0 | ULDPE | Octene | Single Site | Homogeneous | 0.902 | 1.0 |
| IP1065 | Ingenia | 1.8 | LLDPE carrier | — | — | — | 0.920 | 2-10MI carrier |

Example 2

Layers of the Multi-layer Film 2 are prepared with the resins and additives shown in Table 2.

TABLE 2

Formulation for Multi-layer Film 2

| Resin Grade/Trade Name | Supplier | Weight % of Layer | Polymer Type | Comonomer | Catalyst in Resin Manufacture | MWC/ SCBD | Resin Destiny; g/cm³ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 72.5 | LLDPE | Octene | Single Site | Homogeneous | 0.917 | 1.00 |
| MarflexD350 | Chevron-Phillips | 25.0 | LLDPE | Hexane | Single Site | Honogeneous | 0.933 | 0.90 |
| IP1065 | Ingenia | 1.8 | LLDPE carrier | — | — | — | 0.920 | 2-10MI carrier |
| IT 719 | Ingenia | 0.7 | LLDPE carrier | — | — | — | 1.140 | 2-10MI carrier |
| First & Second Interposed-Layer (B & D); Extruder $E_C$ | | | | | | | | |
| Inspire PP D114 | Dow | 87.2 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Engage8150 | Dow | 4.5 | ULDPE | Octene | Single Site | Homogeneous | 0.868 | 0.50 |
| IP1065 | Ingenia | 1.8 | LLDPE carrier | — | — | — | 0.920 | 2-10MI carrier |
| Core-Layer (C); Extruder $E_B$ | | | | | | | | |
| Surpass FPs117C | Nova | 79.2 | LLDPE | Octene | Single Site | Homogeneous | 0.917 | 1.00 |
| EquistarNA960 | Lyondell-Basell | 10.0 | HP-LDPE | None | High Pressure | Heterogeneous | 0.919 | 1.0 |
| Engage8150 | Dow | 9.0 | ULDPE | Octene | Single Site | Homogeneous | 0.868 | 0.50 |
| IP1065 | Ingenia | 1.8 | LLDPE carrier | — | — | — | 0.920 | 2-10MI carrier |

Example 3

Layers of the Multi-layer Film 3 are prepared with the resins and additives shown in Table 3.

TABLE 3

Formulation for Multi-layer Film 3

| Resin Grade/Trade Name | Supplier | Weight % of Layer | Polymer Type | Comonomer | Catalyst in Resin Manufacture | MWC/ SCBD | Resin Destiny; g/cm³ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 72.5 | LLDPE | Octene | Single Site | Homogeneous | 0.917 | 1.00 |
| MarflexD350 | Chevron-Phillips | 25.0 | LLDPE | Hexane | Single Site | Honogeneous | 0.933 | 0.90 |
| IP1065 | Ingenia | 1.8 | LLDPE carrier | — | — | — | 0.920 | 2-10MI carrier |
| IT 719 | Ingenia | 0.7 | LLDPE carrier | — | — | — | 1.140 | 2-10MI carrier |
| First & Second Interposed-Layer (B & D); Extruder $E_C$ | | | | | | | | |
| Inspire PP D114 | Dow | 80.4 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Sclair RP020D | Dow | 10.0 | ULDPE | Octene | Zeigler Natta | Homogeneous | 0.922 | 0.70 |
| IP1065 | Ingenia | 1.6 | LLDPE carrier | — | — | — | 0.920 | 2-10MI carrier |
| Core-Layer (C); Extruder $E_B$ | | | | | | | | |
| Sclair RP020D | Nova | 60.6 | LLDPE | Octene | Zeigler Natta | Homogeneous | 0.922 | 0.70 |
| EquistarNA960 | Lyondell-Basell | 30.0 | HP-LDPE | None | High Pressure | Heterogeneous | 0.919 | 1.0 |

TABLE 3-continued

Formulation for Multi-layer Film 3

| Resin Grade/Trade Name | Supplier | Weight % of Layer | Polymer Type | Comonomer | Catalyst in Resin Manufacture | MWC/ SCBD | Resin Destiny; g/cm³ | Melt-index deci g/min |
|---|---|---|---|---|---|---|---|---|
| Affinity PL1880 | Dow | 9.0 | ULDPE | Octene | Single Site | Homogeneous | 0.902 | 1.0 |
| IP1065 | Ingenia | 0.4 | LLDPE carrier | — | — | — | 0.920 | 2-10MI carrier |

Example 4

Layers of the Multi-layer Film 4 are prepared with the resins and additives shown in Table 4.

TABLE 4

Formulation for Multi-layer Film 4

| Resin Grade/Trade Name | Supplier | Weight % of Layer | Polymer Type | Comonomer | Catalyst in Resin Manufacture | MWC/ SCBD | Resin Destiny; g/cm³ | Melt-index deci g/min |
|---|---|---|---|---|---|---|---|---|
| Inner & Outer Sealant-Layer (A & E); Extruder $E_A$ | | | | | | | | |
| Elite 5100G | Dow | 70.0 | LLDPE | Octene | Single Site Reactor Blend | Heterogeneous | 0.920 | 1.00 |
| MarflexD350 | Chevron-Phillips | 25.0 | LLDPE | Hexane | Single Site | Honogeneous | 0.933 | 0.90 |
| IP1065 | Ingenia | 2.0 | LLDPE carrier | — | — | — | 0.920 | 2-10MI carrier |
| IP1052 | Ingenia | 2.0 | LLDPE carrier | — | — | — | 1.000 | 2-10MI carrier |
| IP1142 | Ingenia | 1.0 | LLDPE carrier | — | — | — | — | — |
| First & Second Interposed-Layer (B & D); Extruder $E_C$ | | | | | | | | |
| Inspire PP D114 | Dow | 80.0 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Elite 5100G | Dow | 10.0 | LLDPE | Octene | Single Site Reactor Blend | Heterogeneous | 0.920 | 0.85 |
| IP1065 | Ingenia | 2.0 | LLDPE carrier | — | — | — | 0.920 | 2-10MI carrier |
| Core-Layer (C); Extruder $E_B$ | | | | | | | | |
| Elite 5100G | Dow | 59.0 | LLDPE | Octene | Single Site Blend | Heterogeneous | 0.920 | 0.85 |
| PE 6621 | Dow | 30.0 | HP-LDPE | None | High Pressure | Heterogeneous | 0.919 | 0.50 |
| Engage8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10MI carrier |

Example 5

Layers of the Multi-layer Film 5 are prepared with the resins and additives shown in Table 5.

TABLE 5

Formulation for Multi-layer Film 5

| Resin Grade/Trade Name | Supplier | Weight % of Layer | Polymer Type | Comonomer | Catalyst in Resin Manufacture | MWC/ SCBD | Resin Destiny; g/cm³ | Melt-index deci g/min |
|---|---|---|---|---|---|---|---|---|
| Inner & Outer Sealant-Layer (A & E); Extruder $E_A$ | | | | | | | | |
| Elite 5100G | Dow | 94.5 | LLDPE | Octene | Single Site Reactor Blend | Heterogeneous | 0.920 | 0.85 |
| IP1065 | Ingenia | 2.0 | LLDPE carrier | — | — | — | 0.920 | 2-10MI carrier |

TABLE 5-continued

Formulation for Multi-layer Film 5

| Resin Resin Grade/Trade Name | Supplier | Weight % of Layer | Polymer Type | Comonomer | Catalyst in Resin Manufacture | MWC/SCBD | Resin Destiny; g/cm$^3$ | Melt-index deci g/min |
|---|---|---|---|---|---|---|---|---|
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| Inspire PP D114 | Dow | 80.0 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Elite 5400G | Dow | 10.0 | LLDPE | Octene | Single Site Reactor Blend | Heterogeneous | 0.916 | 1.0 |
| IP1065 | Ingenia | 2.0 | LLDPE carrier | — | — | — | 0.920 | 2-10MI carrier |
| Core-Layer (C); Extruder $E_B$ | | | | | | | | |
| Elite 5100G | Dow | 68.0 | LLDPE | Octene | Single Site Reactor Blend | Heterogeneous | 0.920 | 0.85 |
| PE 6621 | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10MI carrier |

Example 6

Layers of the Multi-layer Film 6 are prepared with the resins and additives shown in Table 6.

TABLE 6

Formulation for Multi-layer Film 6

| Resin Resin Grade/Trade Name | Supplier | Weight % of Layer | Polymer Type | Comonomer | Catalyst in Resin Manufacture | MWC/SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Affinity PL1840G | Dow | 92.5 | LLDPE | Octene | Single Site | Heterogeneous | 0.909 | 1.0 |
| IP1065 | Ingenia | 2.0 | LLDPE carrier | — | — | — | 0.920 | 2-10MI carrier |
| IP1061A | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| Inspire PP D114 | Dow | 80.0 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Elite 5110G | Dow | 10.0 | LLDPE | Octene | Single Site Reactor Blend | Heterogeneous | 0.9255 | 0.85 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 68.0 | LLDPE | Octene | Single Site | Homogeneous | 0.917 | 1.0 |
| PE 6621 | Dow | 30.0 | HP-LDPE | None | High Pressure | Heterogeneous | 0.919 | 0.50 |
| IP1065 | Ingenia | 2.0 | LLDPE carrier | — | — | — | 0.920 | 2-10MI carrier |

Example 7

Layers of the Multi-layer Film 7 are prepared with the resins and additives shown in Table 7.

TABLE 7

Formulation for Multi-layer Film 7

| Resin Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Exceed 1015C | Exxon-Mobil | 94.5 | LLDPE | Hexene | Single Site Reactor Blend | Heterogeneous | 0.915 | 1.0 |
| IP1065 | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| T14007G | Sunoco | 80.0 | HEPI | Minor component ethylene | Zeigler-Natta | Heterogeneous | 0.9 | 0.70 |
| Compatibilized EMAC SP2207 | Westlake | 8.0 | EMAC | Methacrylate | High Pressure | Heterogeneous | 0.941 | 6.0 |
| Elite 5110G | Dow | 10.0 | LLDPE | Octene | Single Site Reactor Blend | Heterogeneous | 0.9255 | 0.85 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 68.0 | LLDPE | Octene | Single Site | Homogeneous | 0.917 | 1.0 |
| PE 1321 | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10MI carrier |

Example 8

Layers of the Multi-layer Film 8 are prepared with the resins and additives shown in Table 8.

TABLE 8

Formulation for Multi-layer Film 8

| Resin Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 85.5 | LLDPE | Octene | Single Site | Homogeneous | 0.917 | 1.0 |
| Engage8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| Inspire PP D114 | Dow | 65.0 | HEPI | Minor component ethylene | Single Site Reactor Blend | Heterogeneous | 0.9 | 0.70 |
| Compatibilized EMAC SP2207 | Westlake | 8.0 | EMAC | Methacrylate | High Pressure | Heterogeneous | 0.941 | 6.0 |
| Sclair 19C | Nova | 25.0 | HDPE | None | Zeigler-Natta | Heterogeneous | 0.9258 | 0.95 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 68.0 | LLDPE | Octene | Single Site | Homogeneous | 0.917 | 1.0 |
| PE 6621 | Dow | 30.0 | HP-LDPE | None | High Pressure | Heterogeneous | 0.919 | 0.5 |
| IP1065 | Ingenia | 2.0 | LLDPE carrier | — | — | — | 0.920 | 2-10MI carrier |

Example 9

Layers of the Multi-layer Film 9 are prepared with the resins and additives shown in Table 9.

TABLE 9

Formulation for Multi-layer Film 9

| Resin Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 85.5 | LLDPE | Octene | Single Site | Homogeneous | 0.917 | 1.0 |
| Engage8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| Inspire PP D114 | Dow | 45.0 | HEPI | Minor component ethylene | Single Site Reactor Blend | Heterogeneous | 0.9 | 0.50 |
| Compatibilized EMAC SP2207 | Westlake | 8.0 | EMAC | Methacrylate | High Pressure | Heterogeneous | 0.941 | 6.0 |
| Elite 5960G | Nova | 45.0 | HDPE | None | Single Site Reactor Blend | Heterogeneous | 0.962 | 0.85 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 68.0 | LLDPE | Octene | Single Site | Homogeneous | 0.917 | 1.0 |
| PE 6621 | Dow | 30.0 | HP-LDPE | None | High Pressure | Heterogeneous | 0.919 | 0.22 |
| IP1065 | Ingenia | 2.0 | LLDPE carrier | — | — | — | 0.920 | 2-10MI carrier |

Example 10

Layers of the Multi-layer Film 10 are prepared with the resins and additives shown in Table 10.

TABLE 10

Formulation for Multi-layer Film 10

| Resin Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 94.5 | LLDPE | Octene | Single Site | Homogeneous | 0.916 | 0.65 |
| IP1065 | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| Inspire PP D114 | Dow | 40.0 | HEPI | Minor component ethylene | Single Site Reactor Blend | Heterogeneous | 0.9 | 0.75 |
| Compatibilized EMAC SP2207 | Westlake | 8.0 | EMAC | Methacrylate | High Pressure | Heterogeneous | 0.941 | 6.0 |
| Elite 5960G | Dow | 50.0 | HDPE | None | Single Site Reactor Blend | Heterogeneous | 0.962 | 0.85 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 68.0 | LLDPE | Octene | Single Site | Homogeneous | 0.916 | 0.65 |
| PE 1231 | Dow | 30.0 | HP-LDPE | None | High Pressure | Heterogeneous | 0.922 | 0.22 |
| IP1065 | Ingenia | 2.0 | LLDPE carrier | — | — | — | 0.920 | 2-10MI carrier |

Example 11

Layers of the Multi-layer Film 11 are prepared with the resins and additives shown in Table 11.

TABLE 11

Formulation for Multi-layer Film 11

| Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Surpass FPs117C | Nova | 85.5 | LLDPE | Octene | Single Site | Homogeneous | 0.917 | 1.0 |
| Engage8150 | Dow | 9.0 | ULDPE | Octene | Single Site | Homogeneous | 0.868 | 0.50 |
| IP1065 | Ingenia | 2.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.5 | LLDPE carrier | — | — | — | 0.930 | 2-10MI carrier |
| First & Second Interposed-Layer (B & D); Extruder $E_C$ | | | | | | | | |
| 4170 | Total Petrochemicals | 75.0 | HEPI | Minor component ethylene | Zeigler-Natta | Heterogeneous | 0.905 | 0.75 |
| Compatibilized EMAC SP2207 | Westlake | 8.0 | EMAC | Methacrylate | High Pressure | Heterogeneous | 0.941 | 6.0 |
| Dowlex 2045G | Dow | 15.0 | LLDPE | None | Zeigler-Natta | Heterogeneous | 0.920 | 1.00 |
| IP1065 | Ingenia | 2.0 | LLDPE carrier | — | — | — | 0.920 | 2-10MI carrier |
| Core-Layer (C); Extruder $E_B$ | | | | | | | | |
| Surpass FPs117C | Dow | 73.0 | LLDPE | Octene | Single Site | Homogeneous | 0.917 | 1.0 |
| PE 1231 | Dow | 25.0 | HP-LDPE | None | High Pressure | Heterogeneous | 0.922 | 0.22 |
| IP1065 | Ingenia | 2.0 | LLDPE carrier | — | — | — | 0.920 | 2-10MI carrier |

Example 12

Layers of the Multi-layer Film 10 are prepared with the resins and additives shown in Table 12.

TABLE 12

Formulation for Multi-layer Film 12

| Resin Grade/Trade Name | Supplier | Weight % of Layer | Polymer Type | Comonomer | Catalyst in Resin Manufacture | MWC/ SCBD | Resin Destiny; g/cm$^3$ | Melt-index deci g/min |
|---|---|---|---|---|---|---|---|---|
| Inner & Outer Sealant-Layer (A & E); Extruder $E_A$ | | | | | | | | |
| Enable20-10CE | Exxon-Moblil | 98.0 | LLDPE | Hexene | Single Site Reactor Blend | Heterogeneous | 0.92 | 1.0 |
| IP1065 | Ingenia | 1.0 | LLDPE carrier | — | — | — | 0.920 | 2-10MI carrier |
| IP1051 | Ingenia | 2.0 | LLDPE carrier | — | — | — | 1.000 | 2-10MI carrier |
| IP1142 | Ingenia | 1.0 | LLDPE carrier | — | — | — | 0.930 | 2-10MI carrier |
| First & Second Interposed-Layer (B & D); Extruder $E_C$ | | | | | | | | |
| T14005F | Sunoco | 80.1 | HEPI | Minor component ethylene | Zeigler-Natta | Heterogeneous | 0.9 | 0.50 |
| Compatibilized EMAC SP2207 | Westlake | 8.0 | EMAC | Methacrylate | High Pressure | Heterogeneous | 0.941 | 6.00 |
| Enable20-10CE | Exxon-Moblil | 10 | LLDPE | Hexene | Single Site Reactor Blend | Heterogeneous | 0.92 | 1.0 |
| IP1065 | Ingenia | 1.9 | LLDPE carrier | — | — | — | 0.920 | 2-10MI carrier |
| Core-Layer (C); Extruder $E_B$ | | | | | | | | |
| Enable20-10CE | Exxon-Moblil | 85 | LLDPE | Hexene | Single Site Reactor Blend | Homogeneous | 0.92 | 1.0 |
| Affinity PL 1880 | Dow | 15 | ULDPE | Octene | Single Site | Homogeneous | 0.920 | 1.0 |

What is claimed:

1. A process for making pouches filled with a flowable material, using a vertical form, fill and seal apparatus, wherein each pouch is made from a flat web of film by the following steps:
   (I) forming a tubular film therefrom with a longitudinal seal and subsequently flattening said tubular film at a first position;
   (II) transversely heat-sealing said tubular film at the flattened position;
   (III) filling said tubular film with a predetermined quantity of flowable material above said first position;
   (IV) flattening said tubular film above the predetermined quantity of flowable material at a second position; and
   (V) transversely heat sealing said tubular film at said second position,
   wherein said pouches are made from a flat web of film made from a multi-layer film, consisting of the following layers in order, an at least one inner sealant-layer, a first at least one interposed layer adjacent to said one inner sealant layer, an at least one core layer adjacent to said interposed layer, an at least a second interposed layer adjacent to said core layer and at an at least one outer sealant-layer adjacent to said second interposed layer:
   (A) said at least one inner sealant-layer and said outer sealant layer each consisting of:
      (i) from about 85 to about 98 parts by weight of a low-density copolymer of ethylene and an at least one $C_4$-$C_{10}$, alpha-olefin manufactured in a polymerization process using a single-site polymerization catalyst, with a density in the range of from about 0.909 to about 0.935 g/cm$^3$ and a melt-index in the range of from about 0.5 to about 1.5, and
      (ii) from about 2 to about 15 parts by weight of an additional at least one low-density copolymer of ethylene and an at least one $C_4$-$C_{10}$ alpha-olefin, which is an ultra-low density copolymer of ethylene and at least one $C_4$-$C_{10}$ alpha-olefin manufactured in a polymerization process using a single-site polymerization catalyst, with a density in the range of from about 0.859 to about 0.888 g/cm$^3$ and a melt-index in the range of from about 0.4 to about 0.6 dg/min;
   (B) said first at least one interposed layer adjacent to said at least one inner sealant layer and said second interposed layer each consisting of:
      (i) at least one polypropylene interpolymer in the range of from about 40 to about 95 parts by weight of said first at least one interposed layer, wherein said polypropylene interpolymer has a melt-index in the range of from about 0.45 to about 0.75 dg/min, at least one high-density polyethylene is in the range of from about 0 to about 50 parts by weight of said first at least one interposed layer, wherein said at least one high-density polyethylene is manufactured in a polymerization process using a single-site polymerization catalyst or a Ziegler-Natta catalyst, wherein said at least one high-density polyethylene has a density greater than about 0.935 g/cm$^3$ but less than about 0.970 g/cm$^3$ and a melt-index in the range of from about 0.75 to about 1.05 dg/min, and at least one polymer compatibilizer in the range of from about 2 to about 10 parts by weight of said first at least one interposed layer; and
      (ii) at least one ethylene-alpha olefin copolymer in the range from 0 to about 15 parts by weight of said first at least one interposed layer, wherein at least one $C_4$-$C_{10}$ alpha-olefin is an ultra-low density copolymer of ethylene and at least one $C_4$-$C_{10}$ alpha-olefin manufactured in a polymerization process using a single-site polymerization catalyst, with a density in the range of from about 0.859 to about 0.905 g/cm$^3$ and a melt-index in the range of from about 0.4 to about 1.1 dg/min, and
      (iii) at least one additional ethylene-alpha-olefin copolymer in the range of from about 0 parts to 15 parts by weight, manufactured in a polymerization process using either a single-site or Zeigler-Natta polymerization catalyst, wherein said copolymer has a density in the range of from about 0.909 to about 0.935 g/cm$^3$ and a melt-index in the range of from about 0.5 to about 1.5 dg/min; and
   (C) at least one core layer, adjacent to said first at least one interposed layer and said second interposed layer, said core layer consisting of:
      i) at least one low density ethylene-alpha olefin copolymer in the range from 35 to about 85 parts by weight of said at least one core layer manufactured in a polymerization process using either a single-site or ZeiglerNatta polymerization catalyst, wherein said copolymer has a density in the range of from about 0.909 to about 0.935 g/cm$^3$ and a melt-index in the range of from about 0.5 to about 1.5 dg/min;
      (ii) an at least one low-density copolymer of ethylene and an at least one $C_4$-$C_{10}$ alpha-olefin in the range of about 0-15 parts by weight of said at least one core layer, which is an ultra-low density copolymer of ethylene and at least one $C_4$-$C_{10}$ alpha-olefin manufactured in a polymerization process using a single-site polymerization catalyst, with a density in the range of from about 0.859 to about 0.905 g/cm$^3$ and a melt-index in the range of from about 0.4 to about 1.1 dg/min; and
      (iii) at least one low-density ethylene homopolymer or copolymer, made in a high pressure polymerization process, in the range of from about 10 parts to 50 parts by weight of said at least one core layer, wherein the ethylene homopolymer has a density in the range of from about 0.918 to about 0.923 g/cm$^3$ and a melt-index in the range of from about 0.1 to 1.1 dg/min, and the ethylene copolymer has a density in the range of from about 0.930 to about 0.960 g/cm$^3$ and a melt-index in the range of from about 0.1 to about 10 dg/min. and
   wherein the combined thickness of said first and second interposed layers is in the range of from about 10% to about 27% of the total thickness of said multilayer film and wherein the combined thickness of said inner and outer sealant-layers are in a range of from about 10% to about 27% of the total thickness of said multi-layer film and wherein the core layer thickness ranges from about 46% to about 80% of the total thickness of the multi-layer film, and wherein said multilayer film thickness is in the range of from about 38 microns to about 63 microns.

2. The process of claim 1 wherein the polypropylene interpolymer of the multilayer film consists of an interposed layer of a heterogeneous or homogeneous copolymer of polypropylene or blend of copolymer polypropylenes with homopolymer polypropylenes.

3. The process of claim 2 wherein said polypropylene interpolymer is a polypropylene or blend of polypropylenes with izod impact strength of greater than 9 ft-lb$_f$ per inch of notch as per American Society for Testing and Materials (ASTM) D 256.

4. The process of claim 1 wherein said multi-layer film has a thickness is in the range of from about 44 microns to about 60 microns.

5. The process of claim 1 wherein said multi-layer film thickness is in the range of from about 47 microns to about 59 microns.

* * * * *

UNITED STATES PATENT AND TRADEMARK OFFICE
CERTIFICATE OF CORRECTION

PATENT NO. : 9,757,926 B2
APPLICATION NO. : 15/364485
DATED : September 12, 2017
INVENTOR(S) : Alan Keith Breck It is certified that error appears in the above-identified patent and that said Letters Patent is hereby corrected as shown below:

In the Specification

At Columns 39 and 49, Example 12, under "Inner & Outer Sealant-Layer (A&E); Extruder $E_A$" delete the third row of data beginning with "IP1051" and ending with "2-10MI carrier"

Signed and Sealed this
Eleventh Day of December, 2018

Andrei Iancu
*Director of the United States Patent and Trademark Office*